(12) United States Patent
Bankestrom et al.

(10) Patent No.: US 7,461,462 B2
(45) Date of Patent: Dec. 9, 2008

(54) DEVICE, METHOD, COMPUTER PROGRAM PRODUCT, AND CARRIER FOR INDICATING AT LEAST ONE OF AN ORBIT OF, AND A DEVIATION FROM A NOMINALLY ROUND SURFACE

(75) Inventors: Jan-Olof Bankestrom, Vastra Frolunda (SE); Goran Gabrielsson, Saro (SE); Anders Gothberg, Lerum (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 11/363,054

(22) Filed: Feb. 28, 2006

(65) Prior Publication Data
US 2006/0196065 A1 Sep. 7, 2006

(30) Foreign Application Priority Data
Mar. 1, 2005 (EP) .................................. 05101566

(51) Int. Cl.
*G01B 21/20* (2006.01)
(52) U.S. Cl. ........................................... 33/550; 33/551
(58) Field of Classification Search .............. 33/501.02, 33/504, 550, 551, 552, 555.1, 657; 702/167
See application file for complete search history.

(56) References Cited

U.S. PATENT DOCUMENTS

| | | | |
|---|---|---|---|
| 4,048,849 A | 9/1977 | Gocho et al. | |
| 4,050,293 A * | 9/1977 | Shimomura et al. | 33/501.02 |
| 4,084,324 A | 4/1978 | Whitehouse | |
| 4,625,429 A | 12/1986 | Danielli | |
| 4,903,413 A * | 2/1990 | Bellwood | 33/551 |
| 5,022,267 A | 6/1991 | Shattuck et al. | |
| 5,077,908 A | 1/1992 | Moore | |
| 5,337,485 A * | 8/1994 | Chien | 33/550 |
| 5,359,784 A * | 11/1994 | Tomida et al. | 33/550 |
| 5,535,143 A * | 7/1996 | Face | 33/552 |
| 6,154,713 A * | 11/2000 | Peter et al. | 33/504 |
| 6,272,762 B1 | 8/2001 | Kinast et al. | |
| 6,430,832 B1 * | 8/2002 | Dall'Aglio et al. | 33/555.1 |
| 6,568,096 B1 * | 5/2003 | Svitkin et al. | 33/550 |
| 7,107,696 B2 * | 9/2006 | Melander | 33/555.1 |
| 2005/0166414 A1 * | 8/2005 | Lum et al. | 33/550 |

FOREIGN PATENT DOCUMENTS

EP  1 043 564 A2  10/2000

\* cited by examiner

*Primary Examiner*—G. Bradley Bennett
(74) *Attorney, Agent, or Firm*—Buchanan, Ingersoll & Rooney PC

(57) ABSTRACT

A device is provided for measuring roundness of a mechanical object even if the mechanical object performs an orbit movement. The orbital movement and the surface roundness are separated. It is even possible to divide the orbital movement into an x component and a y component. The measurement is accomplished in a single measurement. After measuring it is possible to decide what to indicate: the orbit of the mechanical object, the deviation from a nominally round surface, or the combination of both. This is possible since once the data has been obtained it is then possible to use the data once or a number of times to indicate the orbit of the mechanical object, the deviation from a nominally round surface, or the combination of both.

45 Claims, 18 Drawing Sheets

DEVICE, METHOD, COMPUTER PROGRAM PRODUCT, AND CARRIER FOR INDICATING AT LEAST ONE OF AN ORBIT OF, AND A DEVIATION FROM A NOMINALLY ROUND SURFACE

FIELD OF THE INVENTION

The present invention relates to a device, method and computer program product for indicating at least one of an orbit of, and a deviation from a nominally round surface of a mechanical object.

It also relates to a device and method for indicating the quality of a nominally round surface. The invention also relates to a carrier comprising the computer program product and to a storage means comprising distance data usable for the device indicating an orbit of or deviation from a nominally round surface of an object as well as a device for measuring distance data sets being used as input to the device.

BACKGROUND OF INVENTION

In U.S. Pat. No. 5,077,908, an apparatus for measuring the roundness of a surface of an object is disclosed. The apparatus comprises a bifurcated head rotatably mounted upon a spring loaded arm. The head has two edge plates which can be brought into tangential contact with the periphery of a rotating object. When the head is brought into contact with objects of different diameters, the points of contact with the edge plates progress along location locus lines which, when produced, intersect an apex. A displacement transducer mounted upon the head has a spring loaded plunger with a probe which is contacted to and detects inaccuracies upon the periphery of the object. The apparatus disclosed in U.S. Pat. No. 5,077,908 is limited to measuring surface roundness.

In U.S. Pat. No. 4,084,324, a surface measurement apparatus is disclosed. It is of the type in which a sensor is traversed along a path in contact with or adjacent the surface of a component under test. The sensor has three or more transducers which, in the described embodiment, physically contact the surface under test and produce individual signals as they are traversed along the same path over the surface of the component under test. The signals produced by the transducers are amplified and combined in such a way that the composite signal, so produced, is not dependent on any variation in the position of the body of the transducers as the device is traversed along the surface of the component under test. Thus, sensors which are not mounted on accurately preformed datum-determining mounts such as a flat bed or an accurate spindle are used. The apparatus disclosed in U.S. Pat. No. 4,084,324 is limited to measuring surfaces.

In U.S. Pat. No. 4,048,849, a method and apparatus for measuring surface flatness of a material is disclosed. A set of three non-contact gap detectors are arranged at predetermined regular intervals parallel to and in the direction of measurement of the surface flatness of a material. The gap between the material and each detector is measured and computed continuously to continuously measure and indicate the surface flatness of the material without being affected by an overall curve of the material. Also, the period of the occurrences of the defect in the flatness of the material is measured. The apparatus disclosed in U.S. Pat. No. 4,048,849 is limited to measuring the surface flatness.

In U.S. Pat. No. 5,022,267 a roller gauge is disclosed that comprises means for rotating a roller, mechanical-to-electrical transducer means for measuring the diametric variation around the circumference of the roller and converting the diametric variations of the roller into electrical signals which are a function of the diametric variation; and an electrical signal conversion system and a weighting circuit. The apparatus disclosed in U.S. Pat. No. 5,022,267 is limited to measuring the diametric variation surface of a roller.

In U.S. Pat. No. 4,625,429, an apparatus for checking the roundness of rotating objects is disclosed. The apparatus for checking the roundness of objects comprises a basement supporting a motorized spindle for rotating the object to be checked about a horizontal axis, a stanchion fixed to the basement, a control lever and a support element rotatably coupled to the stanchion for rotation about relevant horizontal axes, a measuring device coupled to the lever and the support element, and a processing device. The measuring device comprises a member vertically suspended to the lever and rotatably coupled to the support element, a Vee device fixed to the member and adapted to be arranged upon the object and two measuring heads with movable feelers adapted to contact diametrically opposed points of the object. The processing device is connected to the measuring heads for providing measurements of the out-of-roundness and of the diameter of the object. The apparatus disclosed in U.S. Pat. No. 4,625,429 is limited to measuring the surface roundness.

In U.S. Pat. No. 6,272,762, an ovality measurement tool is disclosed. It measures ovality of a circumferentially deformable cylindrical element having a cylindrical element support, a sensing element for traversing the circumference of the cylindrical element, the sensing element is movable radially with respect to the cylindrical element, and a readout device for reading the amount of movement of the sensing element as it traverses the circumference of the cylindrical element. The apparatus disclosed in U.S. Pat. No. 6,272,762 is limited to measuring the surface ovality.

In EP 1 043 564 A2, a machine control gage system having a control unit, which analyzes roundness of a workpiece, is disclosed. The control unit controls a grinding machine controller in such a manner as to machine the workpiece to a desired size according to data measured by a measuring head. The control unit analyzes roundness of the workpiece according to the data measured by the measuring head and displays the roundness on a touch panel. The invention disclosed in EP 1 043 564 A2 is limited to only indicating roundness of a work piece.

SUMMARY OF THE INVENTION

The present invention deals with the problems of indicating:
 an orbit of a nominally round surface of a mechanical object,
 a deviation from a nominally round surface of a mechanical object,
 a combination of an orbit of and a deviation from a nominally round surface of a mechanical object.

The present invention provides an easy to use, quick, robust and flexible opportunity of solving the problems above. It can be advantageously used in situations that involve surfaces which are difficult to access since the surface to be measured is partially blocked or the objects are too big. Also it offers the opportunity of measuring roundness of a mechanical object even if the mechanical object performs an orbit movement. This is achieved by the invention being able to separate the orbital movement and the surface roundness. It is even possible to divide the orbital movement into an x component and a y component. Another advantage is that the necessary measurement is accomplished in a single measurement. After measuring it is possible to decide what to indicate: the orbit of the mechanical object, the deviation from a nominally round surface, or the combination of both. This is possible since once the data has been obtained it is then possible to use the data once or a number of times to indicate the orbit of the mechanical object, the deviation from a nominally round surface, or the combination of both. Further, its operation is not labor-intensive. Another advantage is that it is cheap since the cost of its components is reasonably low. Another advantage is that the deviation from a nominally round surface of a mechanical object may be used to provide an indication of the quality of the product.

In terms of angular stability, the present invention is quite insensitive to small deviations from intended measuring angles when measuring the surface.

An orbit of a surface is here considered a translatory motion and a center movement of the surface of the mechanical object.

The present invention may be used when analysing roundness, including runout, e.g. as defined by ISO (e.g. ISO 1132-1:2000 and ISO 10816-1) and ANSI/ASME (ANSI/ASME B89.3.4M-1985).

According to the first aspect of the present invention, a device for indicating at least one of an orbit of, and a deviation from a nominally round surface of a mechanical object is disclosed. The mechanical object does not have to be round in general, but only the surface to be analysed. Nominally round here implies that it is intended to be round but it is not the case. The device comprises a processor and output means. The processor is configured for generating a deviation profile, which describes the deviation from a round shape of the surface. The deviation profile is based on distance data sets that equidistantly cover the nominally round surface. A distance data set is a number of distances that is logically linked together. Each distance data set comprises at least three distances, preferably measured simultaneously and measured in a direction of rotation, to the nominally round surface from at least three distance gauges and is related to an angle. Examples of gauges are based on contact and non-contact. A key feature of the present invention is that once a nominally round surface has been measured then information is available for indicating at least one of an orbit of, and a deviation from a nominally round surface of a mechanical object. This means that a single measurement leads to an opportunity of indicating at least one of, or both roundness and orbit. Further, according to the present invention, it is possible to select whether orbit or roundness of a mechanical object is to be generated.

A deviation profile is here identified as one, or a combination, of roundness and orbit.

The at least three distances are measured at distance measuring angles and are measured in a direction of rotation. The distance measuring angles indicate the angles at which the at least three distances have been measured, preferably, but not necessarily, concurrently. The distance measuring angles are preset and are constant during the distance measuring.

The processor is further configured for indicating the deviation profile using the output means to a user, either directly or indirectly, e.g. by means of the processor writing a computer file, or transmitting the deviation profile to another location, using communication capabilities, for storage or remote indication. Alternatively, the deviation profile may be transmitted to and stored in a movable media. It should be pointed out that the generating of the deviation profile does not have to be generated on site, or even at the time of the measuring. For instance, it may be done later at another location.

The surface may be constituted by any technical surface that is intended to present a round feature. Non-limiting examples of technical surfaces according to the present invention include a circle, and a cylindrical helix. Non-limiting examples of mechanical objects presenting the type of surfaces that may be applied to the present invention include raceways of rolling bearings, rotary shafts and screws.

In a preferred embodiment, the processor is further configured for generating the deviation profile by solving a system of simultaneous equations including the distance data sets and the distance measuring angles.

In a preferred embodiment, the processor is further configured for Fourier transforming the deviation profile. This offers the advantage of being able to indicate the deviation using frequency characteristics. However, using Fourier transformation may lead to a result that is easier to understand.

In a preferred embodiment, the processor is further configured for indicating a quality of the distance measuring angles. This will be further dealt with below.

In a preferred embodiment, in case the distance data sets comprise more than three distances, the processor is configured for estimating a measurement error limit based on e.g. Least Mean Square (LMS), or any other suitable norm.

According to the second aspect of the present invention, it relates to a device for indicating the quality of a nominally round surface. Thus the device may be used for indicating the quality of the nominally round surface and consequently the whole mechanical object, as indicated above.

In a preferred embodiment, the device further comprises a distance measuring arrangement comprising at least three distance gauges for measuring the at least three distances. This arrangement is located on site, at least at the time of the measurement of the at least three distances. The arrangement may be portable or stationary.

In a preferred embodiment, the distance measuring arrangement is constituted by a support frame and the at least three distance gauges are arranged thereto in relation to the distance measuring angles. This offers the advantage of simplifying the measurement since this makes it possible to easily obtain a relative movement between the surface and the distance measuring arrangement. In a preferred embodiment, the distance measuring arrangement is rotated a revolution around the mechanical object. In another preferred embodiment, the distance measuring arrangement is maintained in a stationary position and the surface is moved in relation to the distance measuring arrangement. In a preferred embodiment, the distance measuring angles of the distance gauges are changeable between measurements. A measurement is normally at least a full relative revolution.

In a preferred embodiment, the distance measuring arrangement is constituted by separate support elements, of which each presents at least one distance gauge. This offers the advantage that the distance measuring arrangement is quick and easy to set up before measuring and remove after measuring. It also offers an advantage when it comes to measuring with difficult angles. For instance, it may not be possible to arrange a distance measuring arrangement according to the previous embodiment due the size, or working surroundings around the surface to be measured. This embodiment offers flexibility in use caused by flexibility in the angle selection.

In a preferred embodiment, the distance measuring arrangement further comprises at least one A/D converter for converting distances measured by the at least three distance gauges.

In a preferred embodiment, the distance measuring arrangement further comprises an encoder. The encoder is responsible for generating an angle for association with a distance data set.

In a preferred embodiment, the distance measuring angles, using a relative notion, are 3PI/4, 0 (zero), and 7PI/6.

In a preferred embodiment, the processor is further configured for indicating, using the output means, a function deviation of one or more details of manufacturing equipment having processed the surface based on the correspondence between the Fourier transformation of the deviation profile and at least one function deviation indicating frequency. Non-limiting examples of the term detail include details operating with frequencies, including overtones for rotating equipment within the manufacturing equipment, such as a rotary shaft, drive motor and belts. For instance when a belt has become worn, the present invention will indicate that a function deviation has occurred provided that there will be an effect on the products manufactured by the manufacturing equipment. One feature of relevance here is relationships of revolutions of one detail and effects of these revolutions on other details within the manufacturing equipment. This offers the opportunity of easily obtaining diagnose information of the manufacturing equipment. Thus the present invention may also be used to indicate the status of manufacturing equipment.

In a preferred embodiment, the distance data is in a line of the surface of the mechanical object, the line being in one of: a processing direction of the manufacturing equipment, and at least presenting a component in the processing direction of the manufacturing equipment.

In a preferred embodiment, the manufacturing equipment is constituted by at least one of the equipment types for grinding, hot rolling, cold rolling, turning, milling, printing, polishing, and honing.

In a preferred embodiment, the processor is further configured for configuring a frequency map comprising a set of function deviations indicating frequencies. Thus this facilitates a frequency map being changed or set up when manufacturing equipment is serviced or installed.

PREFERRED EMBODIMENTS OF THE INVENTION

Now an embodiment of a system of simultaneous equations will be derived. The fact that the derivation of the formula is done using three distance gauges in relation to a mechanical object can be seen as an attempt to simplify the derivation in order to increase its understanding.

Figure 1:
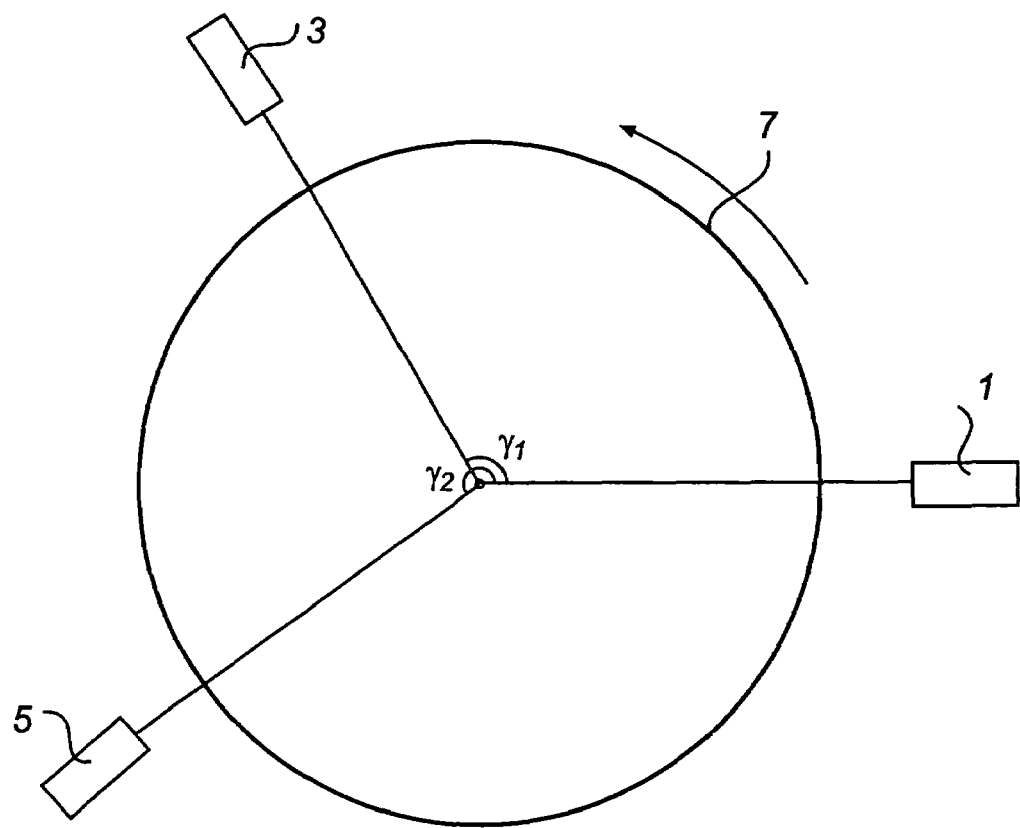
In FIG. 1, a mechanical object with three distance gauges is presented.

In FIG. 1, a mechanical object with three distance gauges 1, 3, 5 is presented. The arrows indicate ways of obtaining a relative rotation between the mechanical object and set up of distance gauges. Using the three distance gauges 1, 3, 5, which at least presenting a distance component in a radial direction, it is possible to form the following expression $$\begin{cases} g_0(\varphi) = x(\varphi) + r(\varphi) \\ g_1(\varphi) = x(\varphi)\cos\gamma_1 + y(\varphi)\sin\gamma_1 + r(\varphi - \gamma_1) \\ g_2(\varphi) = x(\varphi)\cos\gamma_2 + y(\varphi)\sin\gamma_2 + r(\varphi - \gamma_2) \end{cases}$$

where $\varphi$ denotes rotation angle, r denotes roundness deviation and where x and y denote the x and y component of the orbit.

Employing Fourier transformation of the measured signals leads to the following expression:

$$\begin{cases} \hat{g}_0(\omega) = \hat{x}(\omega) + \hat{r}(\omega) \\ \hat{g}_1(\omega) = \hat{x}(\omega)\cos\gamma_1 + \hat{y}(\omega)\sin\gamma_1 + e^{-i\omega\gamma_1}\hat{r}(\omega) \\ \hat{g}_2(\omega) = \hat{x}(\omega)\cos\gamma_2 + \hat{y}(\omega)\sin\gamma_2 + e^{-i\omega\gamma_2}\hat{r}(\omega) \end{cases}$$

In order to obtain $\hat{x}$, $\hat{y}$ and $\hat{r}$ the following equation needs to be solved.

$$\begin{bmatrix} 1 & \cos\gamma_1 & \cos\gamma_2 \\ 0 & \sin\gamma_1 & \sin\gamma_2 \\ 1 & e^{-i\omega\gamma_1} & e^{-i\omega\gamma_2} \end{bmatrix} \begin{bmatrix} a \\ b \\ c \end{bmatrix} = \begin{bmatrix} h_1 \\ h_2 \\ h_3 \end{bmatrix}$$

where, $h_1$, $h_2$, and $h_3$ present the value of 0 or 1, depending on what variables $\hat{x}$, $\hat{y}$ and $\hat{r}$, are desired. For instance, $(h_1, h_2, h_3)$ (1,0,0)

gives values to a, b, and c so that $a\hat{g}_0(\omega) + b\hat{g}_1(\omega) + c\hat{g}_2(\omega) = \hat{x}(\omega).$ In a similar manner, $(h_1, h_2, h_3) = (0,1,0)$ gives values to a, b, and c so that $\hat{y}$ will be provided.

In a similar manner $(h_1, h_2, h_3) = (0,0,1)$ gives values to a, b, and c so that $\hat{r}$ will be provided.

Solutions to the equation above are presented below.

$$\hat{x}(\omega): \begin{bmatrix} h_1 \\ h_2 \\ h_3 \end{bmatrix} = \begin{bmatrix} 1 \\ 0 \\ 0 \end{bmatrix} \Rightarrow \begin{bmatrix} a \\ b \\ c \end{bmatrix} = \begin{bmatrix} (-e^{-i\omega\gamma_2}\sin\gamma_1 + e^{-i\omega\gamma_1}\sin\gamma_2)/N(\omega) \\ -\sin\gamma_2/N(\omega) \\ \sin\gamma_1/N(\omega) \end{bmatrix}$$

$$\hat{y}(\omega): \begin{bmatrix} h_1 \\ h_2 \\ h_3 \end{bmatrix} = \begin{bmatrix} 0 \\ 1 \\ 0 \end{bmatrix} \Rightarrow \begin{bmatrix} a \\ b \\ c \end{bmatrix} = \begin{bmatrix} (-e^{i\omega\gamma_2}\cos\gamma_1 + e^{-i\omega\gamma_1}\cos\gamma_2)/N(\omega) \\ (-e^{i\omega\gamma_2} + \cos\gamma_2)/N(\omega) \\ (e^{-i\omega\gamma_2} - \cos\gamma_1)/N(\omega) \end{bmatrix}$$

$$\hat{r}(\omega): \begin{bmatrix} h_1 \\ h_2 \\ h_3 \end{bmatrix} = \begin{bmatrix} 0 \\ 0 \\ 1 \end{bmatrix} \Rightarrow \begin{bmatrix} a \\ b \\ c \end{bmatrix} = \begin{bmatrix} \sin(\gamma_1 - \gamma_2)/N(\omega) \\ \sin\gamma_2/N(\omega) \\ -\sin\gamma_1/N(\omega) \end{bmatrix}$$

where $N(\omega) = \sin(\gamma_1 - \gamma_2) - e^{-i\omega\gamma_2}\sin\gamma_1 + e^{-i\omega\gamma_1}\sin\gamma_2$ In order for the solutions to work $N(\omega) <> 0$. To investigate this, the following equations need to be solved:

$$\begin{cases} 0 = \text{Re } N(\omega) = \sin(\gamma_1\gamma_2) \quad \cos(\gamma_2\omega)\sin\gamma_1 | \cos(\gamma_1\omega)\sin\gamma_2 \\ 0 = \text{Im } N(\omega) = \sin(\gamma_2\omega)\sin\gamma_1 \quad \sin(\gamma_1\omega)\sin\gamma_2 \end{cases}$$

The solutions, or zeroes, are given when $$\begin{cases} \sin(\gamma_1\omega) = \pm\sin\gamma_1 \\ \cos(\gamma_1\omega) = \cos\gamma_1 \\ \sin(\gamma_2\omega) = \pm\sin\gamma_2 \\ \cos(\gamma_2\omega) = \cos\gamma_2 \end{cases}$$

which occurs when $$\begin{cases} \omega\gamma_1 = \pm\gamma_1 + k \cdot 360° \\ \omega\gamma_2 = \pm\gamma_2 + l \cdot 360° \end{cases}$$

where k and l are integers.

This means that the first frequency that disappears are the frequencies $\omega_0 +/- 1$ when the integer $\omega_0$ fulfils $$\begin{cases} \omega_0\gamma_1 = k \cdot 360° \\ \omega_0\gamma_2 = l \cdot 360° \end{cases}$$

for as small k and l as possible. This gives the following relation:

$$l \cdot \frac{\gamma_1}{360°} = k \cdot \frac{\gamma_2}{360°}$$

For $\gamma_1 = 135°$ and $\gamma_2 = 210°$, this leads (for instance) $\omega_0 = 24$, with k=14 and l=9. Thus frequencies 23 and 25 disappear. Also, integer multiples of $\omega_0$ solves the same equation, implying that −23, −25, 47, 49, −47, −49, 71, 73, etc disappear. In order to decrease the number of disappearing frequencies k and l are high.

If $\gamma_1$ and $\gamma_2$ are integers, then it is beneficial to select them to have as few prime factors in common as possible. $\omega_0$ may be calculated directly using the following formula:

$\omega_0 = 360/lcd(\gamma_1, \gamma_2, 360)$, where lcd means largest common divisor. It should be pointed out that here the notation of degrees (360 degrees constituting a full circumference) is used. However, radians may have been used instead.

When generalizing the dealing with the angles within the scope of the present invention. If dividing a circumference into three sectors defined by the angles $\gamma_1$, and $\gamma_2$ and if there is an integer relation between A, B, and C, where A, B, and C all lack common divisors (>1), then $\omega_0 = A+B+C$.

Also, it may be observed that, $\omega_0 = 0$ represents a solution that is independent of angles, explaining why the frequencies +1 and −1 always disappear, since a limited roundness of the first order is not distinguishable from a first order translation.

If $\gamma_1$ and $\gamma_2$ are integers, also $\omega_0=360$ will be a solution resulting in frequencies +/−359 and +/−361 also disappearing.

A way of dealing with disappearing frequencies is to employ four distance gauges selected so that the frequencies disappearing in an angular set-up is present in another set-up. Based on the above, it is important to have as high modulus of $N(\omega)$ as possible to decrease noise and decrease the effect of measuring errors in the angles. Having a plurality of angles, it is preferred to select the angular set-up having the largest modulus of $N(\omega)$ for all frequencies. When selecting the angles, it is important to assure that all frequencies are present in the set comprising all angular set ups. The following relation helps to check this.

$\omega_0 = 360/1cd(\gamma_1, \gamma_2, 360)$, where

1cd means largest common divisor.

In a preferred embodiment, the processor is further configured for indicating a quality of the distance measuring angles. The quality of the distance measuring angles indicates a limitation of the transfer function. Since the transfer function above presents zeros, corresponding to disappearing frequencies, it may be important to find out where these zeros are in order to be aware of their limiting effect on the indication. Zeros occur as illustrated above. By selecting angles, as indicated above, it is possible to obtain control over the zeros. For instance, in case there is a particular interest to focus, or disregard, the angles may be selected accordingly. When measuring in situ, the measuring conditions may render certain angles impossible since it may be physically impossible to measure using these angles, due to e.g. blockage. The term in situ here means that the measuring is done when the mechanical object is mounted in its working environment, regardless of whether the mechanical object is, e.g., under potential work load or not. In these cases it may be preferred to use other angles. However, there may be a risk that these angles may result in zeros occurring for one or more k in an uncontrolled fashion. Thus a possibility of changing the angles increases the performance of the present invention. Alternatively, a surface may be measured using two, or more angular set-ups in order to control the effects of the zeros. This offers the opportunity of changing the distance measuring angles allowing multiple measurements of the same surface using different distance measuring angles.

In a preferred embodiment, the processor is further configured for suggesting at least one appropriate distance measuring angle in view of the zeroes of the transfer function. Thus given an almost complete angular set up and a zero that is preferred to be moved, the processor generates one or more alternatives of a distance measuring angle.

Now a second embodiment of a system of simultaneous equations will be derived. The fact that the derivation of the formula is done using three distance gauges in relation to a mechanical object can be seen as an attempt to simplify the derivation in order to increase its understanding. In this preferred embodiment, the processor is configured for generating the deviation profile, R, based on the following expression, AR=G, where A is a matrix based on the distance measuring angles,
R is a vector comprising the deviation profile, and
G is a matrix comprising the distances data sets.

The vector R comprises stacked data concerning the deviation from a nominally round surface and the orbit in two dimensions of the mechanical object. There is an alternative representation of R in the form of a matrix that will be used below.

Considering a nominally round object with some small form imperfections, such as a ring or roller of a rolling element bearing. The example concerns external surfaces but the invention may be applied to internal surfaces. The deviation for round shape can for example be described with the local deviation from the best-fit circle in an LSQ sense. The situation is described in FIG. 1. One practical way of describing the deviation from roundness is to note the deviation at evenly spaced angular increments around the component. If this is done at N equally spaced angular positions, a non-limiting and practical notation is to collect all the local deviations in order in a column vector with N elements. In case it is requested to measure the roundness deviation of such a component, it is arranged mechanically so that a relative rotation is achievable between the components and the measuring arrangement, possibly with some translatory motion superimposed. The position of the component surface is measured with k gauges positioned at certain angles. Gauge number i has the angular position $\gamma_1$.

As the relative rotation is accomplished, all k gauges are read at equal angular increments. One revolution is split in N equal angular increments. The readings are stored in a matrix G where the element $G_{mn}$ represents reading number m of gauge number n. The readings will depend not only on the roundness deviation but also on the possible superimposed translatory motion, i.e. the orbit. A translatory motion of the component can be described with two vectors in analogy with the roundness deviation vector. The first vector consists of the position in x direction in the order of sampling of the center of the best-fit circle to the measured section of the component. The second vector represents in the same way the y direction. The combined data of roundness deviation and translatory motion in the x and y directions, i.e. the orbit, is a result vector R comprising stacked data concerning the deviation from a nominally round surface and the orbit in two dimensions of the mechanical object. $R_{pq}$ represents data belonging to the angular increment number p.q=0 represents roundness deviation, q=1 represents x component of translatory motion and q=2 represents y component of translatory motion.

It will now be described how it is possible to determine both the roundness deviation and the translatory motion of the component from the measurement. This is the same as to determine matrix R above from the gauge data in matrix G above. From the geometry of measuring set-up (assuming small deviations from circular geometry allowing a linear approximation) it is clear that in the absence of measuring errors the following should be true:

$G_{m,n} = R_{mod}(m+a\,n, N), 0 + R_{m,1} \cos \alpha_n + R_{m,2} \cos \alpha_n,$  (I)

where an denotes $a_n$. The angles $\alpha$ should be selected so that $a_n$ in the equation below is an integer:

$2\pi a_n - N\alpha_n$

Rewriting the equation (I) above on the standard form:

Ax=b  (II)

Here A is a matrix and x and b are both column vectors. The matrix R is mapped on x and our matrix G is mapped on b. Matrix A which will be sparse. Only three elements per row will be non zero. If the row index of A is t, we define the nonzero elements of A with the following:

$A_{t,\,mod(mod(t,N)+afloor(t/N),\,N)} = 1$ $A_{t,\,N+mod(t,\,N)} = \cos \alpha_{floor(t/N)},$ $A_{t,\,2N+mod(t,\,N)} = \sin \alpha_{floor(t/N)},$ where afloor(t/N) denotes $a_{floor(t/N)}$.

By mod(x,y) we mean the remainder on dividing x by y and by floor(x) we mean the greatest integer less than or equal to x.

The matrix A will be of dimension kN×3N. Clearly if k>3 the system will be overdetermined and a natural approach is to solve it in a least squares sense. The benefit with the redundancy in such a case is that one can define an error estimate. It should be pointed out that the matrix A may from case to case be unstable from a numerical viewpoint resulting in numerical problems when solving the matrix A.

Now a third embodiment of indicating at least one of an orbit of, and a deviation from a nominally round surface of a mechanical object will be derived. The fact that the derivation of the formula is done using three distance gauges in relation to a mechanical object can be seen as an attempt to simplify the derivation in order to increase its understanding. In a preferred embodiment, the processor is configured for generating the deviation profile, R, based on the following expression, in the case the distance data sets comprise three distances:

$$kr=R, \text{ where}$$

where r is a vector comprising $r_i$ being the distance read by distance gauge i (i=1 ... 3) and k is a vector comprising weights $k_i$ (i=1 ... 3).

Now referring back to FIG. 1 again, a mechanical object with three distance gauges 1, 3, 5 is presented. Using the three distance gauges 1, 3, 5, the operation of which at least presenting a distance component in radial direction, it is possible to form an invariant of the following linear combination:

$$I=kr=(k_1, k_2, k_3)(r_1, r_2, r_3)=k_1 r_1 + k_2 r_2 + k_3 r_3, \quad (F1)$$

where $r_1$ is the distance measured and indicated by the distance gauge number i (i=1 ... 3) and $k_i$ (i=1 ... 3) are corresponding weight factors.

It will now be shown that the linear combination above may be designed to form a formula that is invariant under any rigid body motion of the mechanical object 7. To increase the understanding of the disclosure, the term invariant should be interpreted as invariant under rigid body movement.

Figure 2:
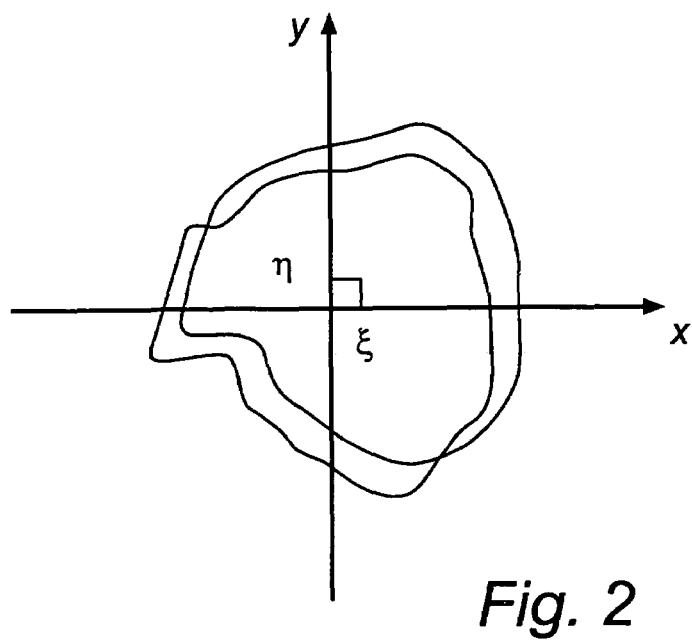
In FIG. 2, a plot of a mechanical object having enlarged deviations from a nominal round shape is presented.

In FIG. 2 a plot of a mechanical object 7 having enlarged deviations from a nominal round shape is presented. Assuming that the mechanical object is displaced $\xi$ in the x direction and $\eta$ in the y direction, then the three distance gauges 1, 3, 5 would indicate the following changes respectively:

Distance gauge 1: $\xi + \eta$ (F2)
Distance gauge 3: $\xi \sin(\gamma_1) + \eta \cos(\gamma_1)$ (F3)
Distance gauge 5: $\xi \sin(\gamma_2) + \eta \cos(\gamma_2)$ (F4)

This will have the following effect on the invariant presented above:

$$I=(k_1, k_2, k_3)(\xi+\eta, \xi \sin(\gamma_1)+\eta \cos(\gamma_1)+ \xi \sin(\gamma_2)+\eta \cos(\gamma_2)) \quad (F5)$$

If $(k_1, k_2, k_3)$ are selected so that the expression above is identically zero regardless of $\xi$ and $\eta$, then the expression above is invariant. This leads to the following equations easily derived from F5 above:

$$k_2 \sin(\gamma_1) + k_3 \sin(\gamma_2) = 0$$

$$k_2 \cos(\gamma_1) + k_3 \cos(\gamma_2) = k_1$$

Without loss of generality, it is possible to set one of the weights to 1, say $k_1$.

This leads the following requirements of $k_2$ and $k_3$ in order to maintain the invariant.

$$k_1 = 1,$$

$$k_2 = \sin(\beta)/\sin(\gamma_1 - \gamma_2), \text{ and}$$

$$k_3 = -\sin(\gamma_1)/\sin(\gamma_1 - \gamma_2)$$

Now selecting the angles so that $\gamma_1$ is set to 3PI/4 and $\gamma_2$ is set to 7PI/6, this leads to the following set of weight factors, $k_i$ (i=1 ... 3):

$$k_1 = 1,$$

$$k_2 = \sqrt{2}/(1+\sqrt{3}), \text{ and}$$

$$k_3 = 2/(1+\sqrt{3}).$$

It should be pointed out, that other angles may also provide a result. However, these angles lead to a favourable opportunity of controlling the zeroes of the spectrum.

Now dealing with the phase and amplitude corrector, without loss of generality the form (roundness) of the mechanical object 7 may be written:

$$r(\varphi) = \sum_{k=0}^{\infty} r_k \cos[k(\varphi + \gamma_k)]$$

In addition, without loss of generality, thanks to the existence of the invariant discussed previously, this may also be to be a possible reading at the position of the first distance gauge 1. For the second and third distance gauges 3, 5 the following readings apply:

$$r(\varphi + \gamma_1) = \sum_{k=0}^{\infty} r_k \cos[k(\varphi + \gamma_k + \gamma_1)], \text{ and}$$

$$r(\varphi + \gamma_2) = \sum_{k=0}^{\infty} r_k \cos[k(\varphi + \gamma_k + \beta)]$$

Using the weight factors $k_i$ (i=1 ... 3), for instance $k_1=1$, $k_2=\sqrt{2}/(1+\sqrt{3})$, and $k_3=2/(1+\sqrt{3})$, it is possible to form the invariant of the expression (F1) above as presented below. This is also the sum of cosines with different phase angles and amplitudes. For each k the terms may be written in the form:

$$A \cos[k(\phi+\gamma_k)] - B \sin[k(\phi+\gamma_k)] = C \cos[k(\phi+\gamma_k)+\delta_k],$$

where $$A = 1 + k_2 \cos(i\gamma_1) + k_3 \cos(i\gamma_2),$$

$$B = k_2 \sin(i\gamma_1) + k_3 \sin(i\gamma_2), \text{ and}$$

$$C = \sqrt{(A^2 + B^2)}$$

These formulas in fact define how to correct the invariant to reflect the true roundness of the mechanical object 7. This concludes the derivation of the invariant and its prerequisites.

In a preferred embodiment, the processor is further configured for indicating a quality of the distance measuring angles. The quality of the distance measuring angles indicates a limitation of the transfer function. Since the transfer function above presents zeros it may be important to find out where these zeros are in order to be aware of their limiting effect on the indication. Zeros occur when C, as defined above, is zero. When C is equal to zero is governed by the following expression:

$$0 = (1 + k_2 \cos(i\gamma_1) + k_3 \cos(i\gamma_2))^2 + (k_2 \sin(i\gamma_1) + k_3 \sin(i\gamma_2))^2$$

By selecting $\gamma_1$, $\gamma_2$ or $k_i$ it is possible to obtain control over the zeros. For instance, in case there is a particular interest to focus, or disregard, the angles $\gamma_1$, $\gamma_2$ and $k_i$ may be selected accordingly. When measuring in situ, the measuring conditions may render certain angles for $\gamma_1$ and $\gamma_2$ impossible since it may be physically impossible to measure using these angles, due to e.g. blockage. In these cases it may be preferred to use other angles. However, there may be a risk that these angles may result in zeros occurring for one or more k in an uncontrolled fashion. Thus a possibility of changing the angles increases the performance of the present invention. Alternatively, a surface may be measured using two, or more angular set-ups in order to control the effects of the zeros. This offers the opportunity of changing the distance measuring angles allowing multiple measurements of the same surface using different distance measuring angles. In the non-limiting example given above, the zeros occur when k is 1 and when k is 23.

Now returning to the orbit of the mechanical part, it may be deduced by calculating the difference between distance gauge data and the inverse Fourier transformation of the roundness, or more formally put:

Orbit of mechanical part:=Distance gauge data−Inverse Fourier Transformation (Roundness of mechanical part)

This embodiment offers a device that is suited for, but not limited to, harsh environments. Also, it may be implemented as a device that indicates at least one of orbit and roundness in real time. It may also be implemented using analogue electronics. This will also lead to a lower cost of manufacture and potentially a lower time for generating the deviation profile.

In a preferred embodiment, the processor is further configured for generating the deviation profile including forming linear combinations of the distance data sets and weights related to the distance measuring angles, as indicated above.

According to a third aspect of the present invention, a method for indicating at least one of an orbit of, and a deviation from a nominally round surface of a mechanical object is disclosed. The method comprises the following:

Generating a deviation profile based on distance data sets covering the nominally round surface; each distance data set comprising at least three distances, measured in a direction of rotation, to the nominally round surface and related to an angle, the at least three distances having been measured at distance measuring angles; and Indicating the deviation profile.

Features of this aspect present similarities with features of the first aspect. Therefore, reference to the above is made.

In a preferred embodiment, the method further comprises generating the deviation profile by solving a system of simultaneous equations including the distance data sets and the distance measuring angles.

In a preferred embodiment, the method further comprises Fourier transforming the deviation profile.

In a preferred embodiment, the nominally round surface is a technical surface.

According to a fourth aspect, a method for indicating the quality of a nominally round surface is disclosed. Non-limiting examples of products presenting a nominally round surface include a machine tool spindle, including a spindle shaft, bearing surfaces, and gearbox. Non-limiting examples of processes include grinding, e.g. of balls or rollers, hot rolling, cold rolling, turning, milling, printing, polishing, and honing. Features of this aspect present similarities with features of the second aspect. Therefore, reference to the above is made.

In a preferred embodiment, the method further comprises indicating a function deviation of one or more details of manufacturing equipment having processed the surface based on the correspondence between the Fourier transformation of the deviation profile and at least one function deviation indicating frequency. Features of this embodiment present similarities with features of an embodiment above. Therefore, reference to the above is made.

In a preferred embodiment, the manufacturing equipment is constituted by at least one of the equipment types for grinding, hot rolling, cold rolling, turning, milling, printing, polishing, and honing.

In a preferred embodiment the distance data is in a line of the surface of the mechanical object, the line being in one of: a processing direction of the manufacturing equipment, and at least presenting a component in the processing direction of the manufacturing equipment.

In a preferred embodiment, the method further comprises configuring a frequency map comprising a set of function deviation indicating frequencies.

In a preferred embodiment, the method further comprises indicating a quality of the distance measuring angles. Features of this embodiment present similarities with features of an embodiment above. Therefore, reference to the above is made.

In a preferred embodiment, the method further comprises calculating the weights related to the distance measuring angles, in accordance with the above.

In a preferred embodiment, the distance measuring angles are

3PI/4, 0 (i.e. zero), and 7PI/6, and the weights are $k_1 = \sqrt{2}/(1+\sqrt{3})$, $k_2=1$, and $k_3=2/(1+\sqrt{3})$, respectively.

In a preferred embodiment, the method further comprises estimating a measurement error limit, in case the distance data sets comprise more than three distances, as has been indicated above.

According to the fifth aspect of the present invention, a computer program product loadable into the internal memory of a computer is disclosed. It comprises software code portions for performing at least one of the preferred method embodiments, when run on a computer.

According to the sixth aspect of the present invention, a carrier comprising the computer program product above is disclosed.

According to the seventh aspect of the present invention, storage means comprising distance data, as defined above, usable for a device according to the first aspect above is disclosed. The storage means comprises sets of at least three distances, measured in a direction of rotation, to a nominally round surface related to an angle and having been measured at distance measuring angles. This offers the advantage that the measuring of the distances may be made on a location and the processing of the data obtained thereby may be performed subsequently at another location. In a preferred embodiment, the storage means may further comprise the weights related to the distance measuring angles, as described above.

According to an eighth aspect, a device for measuring distance data sets being used as input to a device for indicating at least one of an orbit of, and a deviation from a nominally round surface of a mechanical object. It comprises an encoder and a distance measuring arrangement comprising at least three distance gauges for measuring at least three distances in a direction of rotation, wherein each distance data set comprises the at least three distances to the nominally round surface and related to an angle, where the at least three distances were measured at distance measuring angles.

In a preferred embodiment, the distance measuring arrangement is constituted by a support frame and the at least three distance gauges are arranged thereto in relation to the distance measuring angles.

In a preferred embodiment, the distance measuring arrangement is constituted by separate support elements, of which each presents at least one distance gauge.

In a preferred embodiment, the distance measuring arrangement further comprises at least one A/D converter for converting distances measured by the at least three distance gauges.

In a preferred embodiment, the device further comprises a storage means for storing the distance data sets.

In a preferred embodiment, the device further comprises means for storing distance data sets on a portable media.

In a preferred embodiment, the device further comprises communication capabilities for communicating the distance data sets to a device according to the first aspect.

In a preferred embodiment, the device further comprises weights related to the distance measuring angles.

Non-limiting applications of the present invention include a waviness measuring apparatus, investigations of machine tools spindles, rolls in paper mills, and rolls in steel mills.

Figure 3:
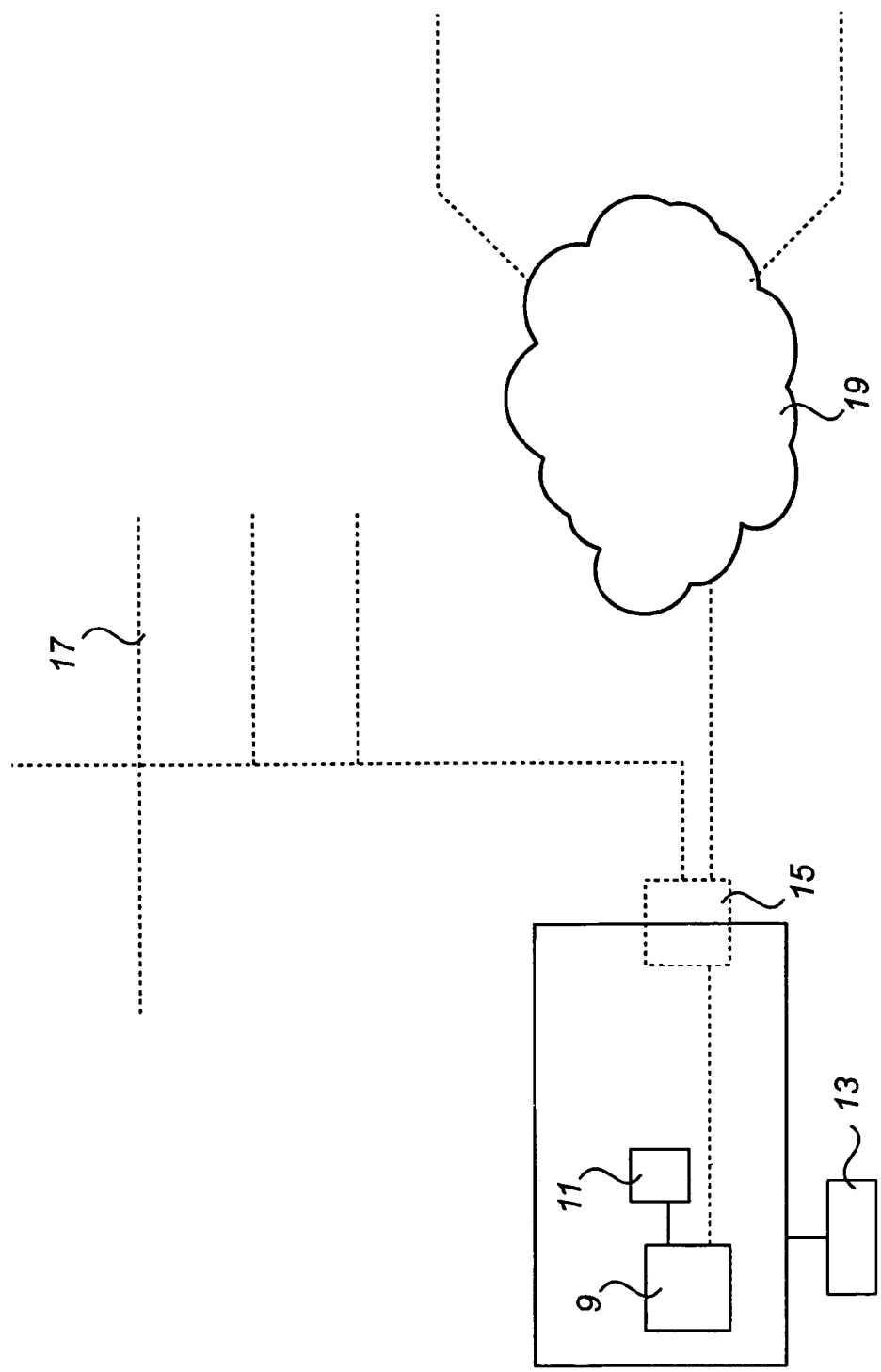
In FIG. 3, a number of embodiments of contextual hardware configurations are schematically indicated.

In FIG. 3, a schematic illustration of a device for indicating a deviation profile comprising at least one of an orbit of, and a deviation from a nominally round surface of a mechanical object. The device comprises a processor and output means is shown. It comprises a processor 9, a memory 11, and output means 13. In one embodiment, the device is constituted by a general-purpose computer, from a hardware viewpoint. The device may be connected, using communication capabilities 15, to a bus 17 or to the internet 19 for receiving distance data. The communication capabilities 15 may be used for remotely indicating the deviation profile 21. Alternatively the device is equipped with a movable media receiving means for handling distance data and/or for handling the indicating of the deviation profile 21.

In Table 1, an example of distance data and its relation to a measuring angle p is given. The measuring angle $\phi$ spans a complete revolution around the mechanical object 7.

TABLE 1

A schematic representation of distance data measured by three distance gauges in relation to angle $\phi$.

| $\phi$ | Distance gauge 1 | Distance gauge 2 | Distance gauge 3 |
|---|---|---|---|
| $\phi_1$ | $d_{1,\phi_1}$ | $d_{2,\phi_1}$ | $d_{3,\phi_1}$ |
| $\phi_2$ | $d_{1,\phi_2}$ | $d_{2,\phi_2}$ | $d_{3,\phi_2}$ |
| $\phi_3$ | $d_{1,\phi_3}$ | $d_{2,\phi_3}$ | $d_{3,\phi_3}$ |
| ... | ... | ... | ... |
| ... | ... | ... | ... |
| ... | ... | ... | ... |
| $\phi_{N-3}$ | $d_{1,\phi_{N-3}}$ | $d_{2,\phi_{N-3}}$ | $d_{3,\phi_{N-3}}$ |
| $\phi_{N-2}$ | $d_{1,\phi_{N-2}}$ | $d_{2,\phi_{N-2}}$ | $d_{3,\phi_{N-2}}$ |
| $\phi_{N-1}$ | $d_{1,\phi_{N-1}}$ | $d_{2,\phi_{N-1}}$ | $d_{3,\phi_{N-1}}$ |
| $\phi_N$ | $d_{1,\phi_N}$ | $d_{2,\phi_N}$ | $d_{3,\phi_N}$ |

Figure 4:
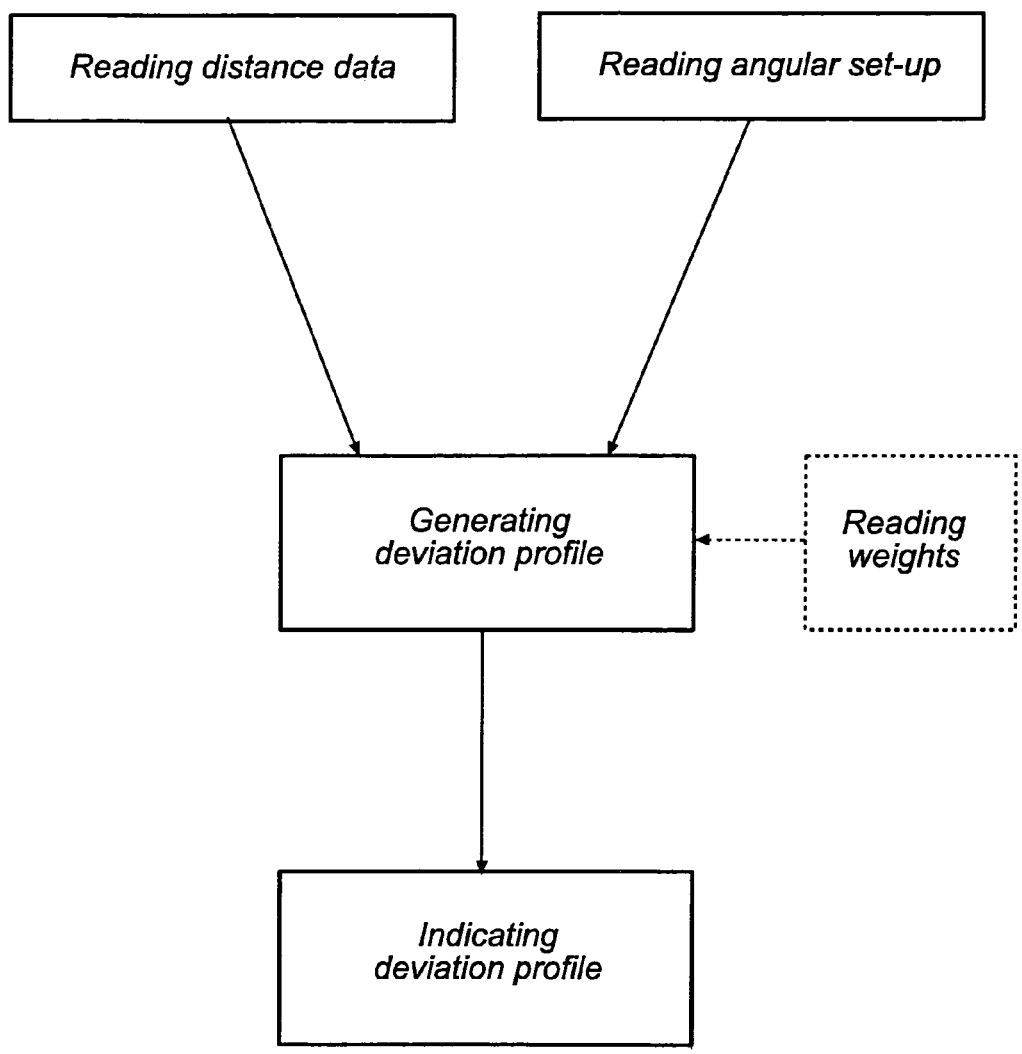
In FIG. 4, an embodiment of a flowchart indicating a method of the present invention.

The processor 9 is configured for generating a deviation profile 21 based on distance data sets covering the nominally round surface, where each distance data set comprises at least three distances to the nominally round surface and related to an angle, and where the at least three distances having been measured at distance measuring angles and measured in a direction of rotation, and for indicating the deviation profile 21 using the output means. This is schematically shown in FIG. 4. A box in FIG. 4 is dashed since 'reading weights' is in an embodiment as indicated above.

Figure 5:
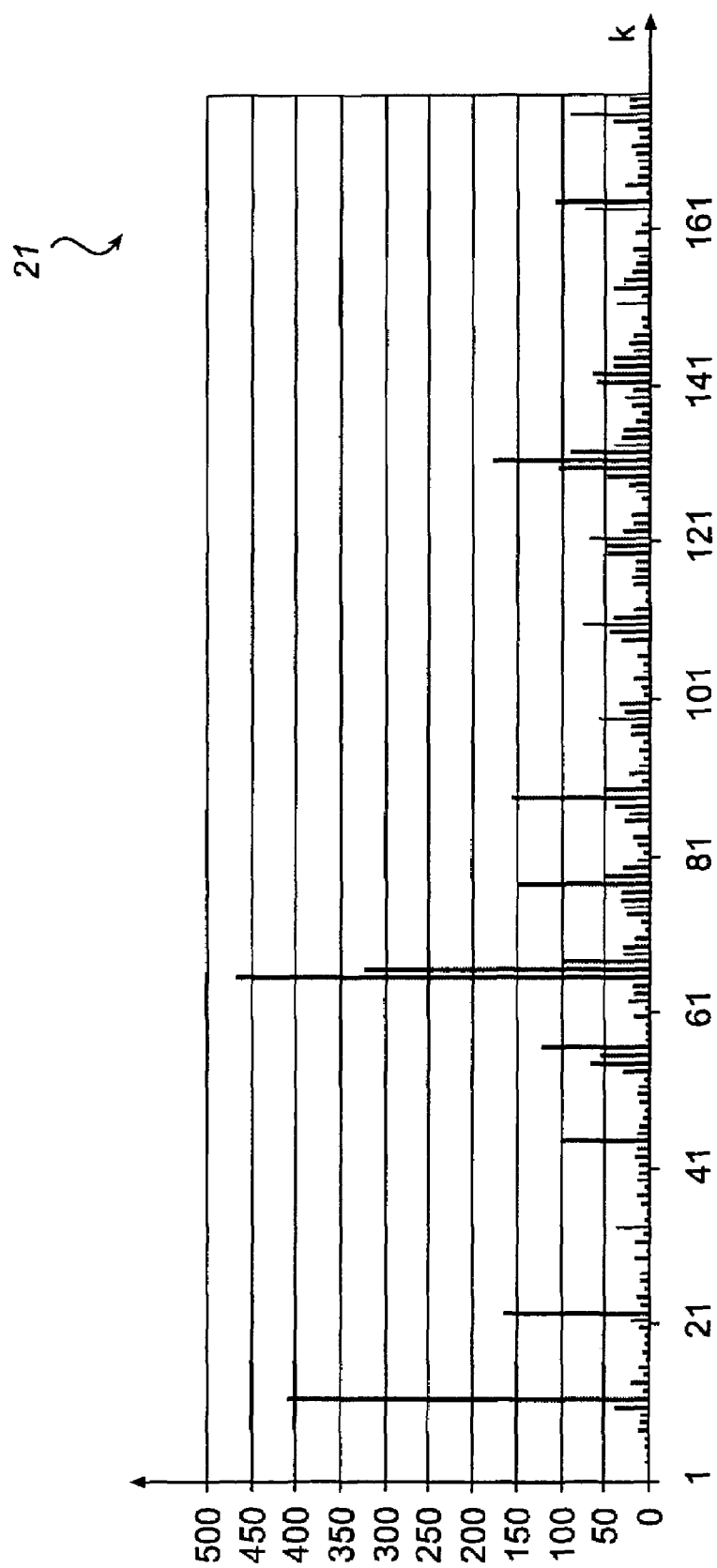
In FIG. 5, an example of a frequency representation of a deviation profile is given.

In a preferred embodiment, the device is used for indicating the quality of the nominally round surface. In FIG. 5, an example of a frequency representation of a deviation profile 21 is given from which it is possible to obtain information regarding the quality of the nominally round surface. A peak in the frequency representation may for instance indicate low quality. Alternatively, the deviation profile, as such, i.e. without Fourier transformation, may provide sufficient information to indicate the quality of the nominally round surface.

Figure 6A:
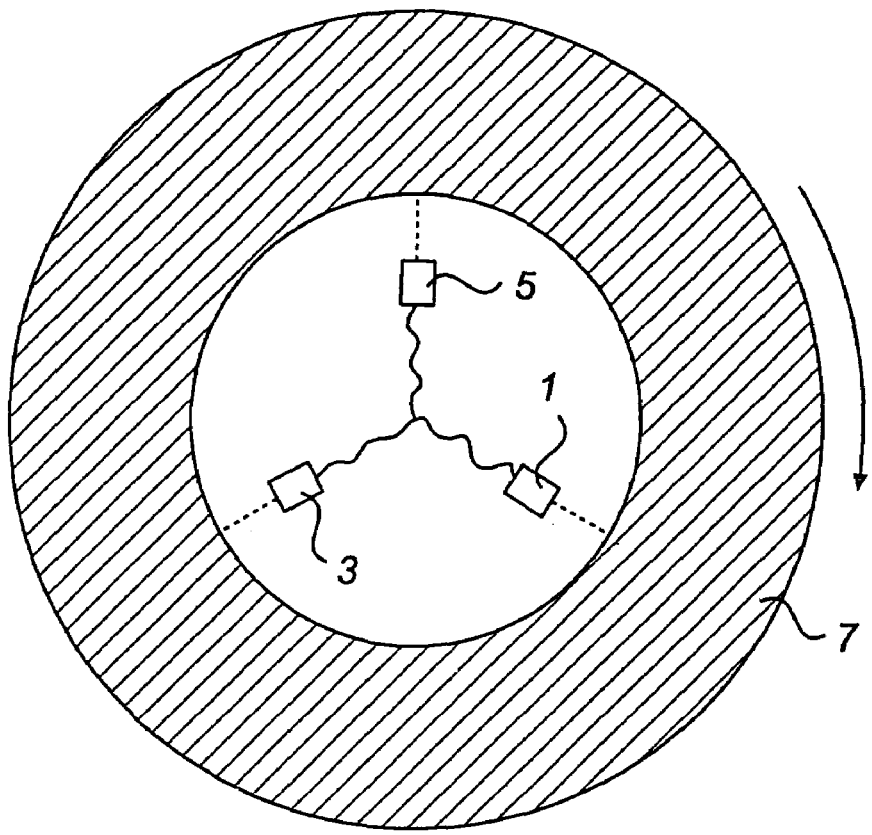
In FIG. 6A, an embodiment of a schematic set up for measuring distances in relation to an inside of a mechanical object is given.
Figure 6B:
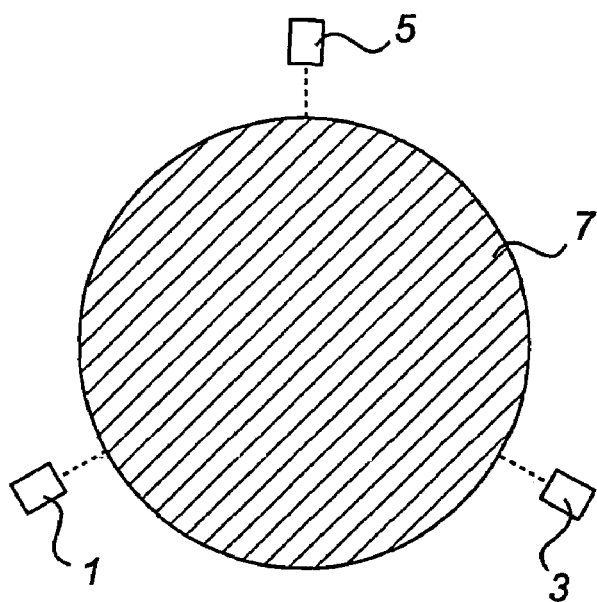
In FIG. 6B, an embodiment of a schematic set up for measuring distances in relation to an outside of a mechanical object is given.

In a preferred embodiment, the device comprises a distance measuring arrangement 23 comprising at least three distance gauges for measuring the at least three distances. The distance measuring arrangement 23 is associated with the device e.g. by means of cable, infrared, or radio. In FIG. 6A, a schematic set up for measuring the distances is given. In this embodiment, there are three distance gauges 1, 3, 5 schematically oriented in relation to an inside of a mechanical object 7, such as a ring or a pipe, to be investigated in terms of roundness and/or orbit movement. The angular alignment of the three distance gauges 1, 3, 5 is in accordance with the selected distance measuring angles. In FIG. 6B, an embodiment is given, in which there are three distance gauges 1, 3, 5 schematically oriented in relation to an outside of a mechanical object 7, in this embodiment a shaft, to be investigated in terms of roundness and/or orbit movement.

Figure 7:
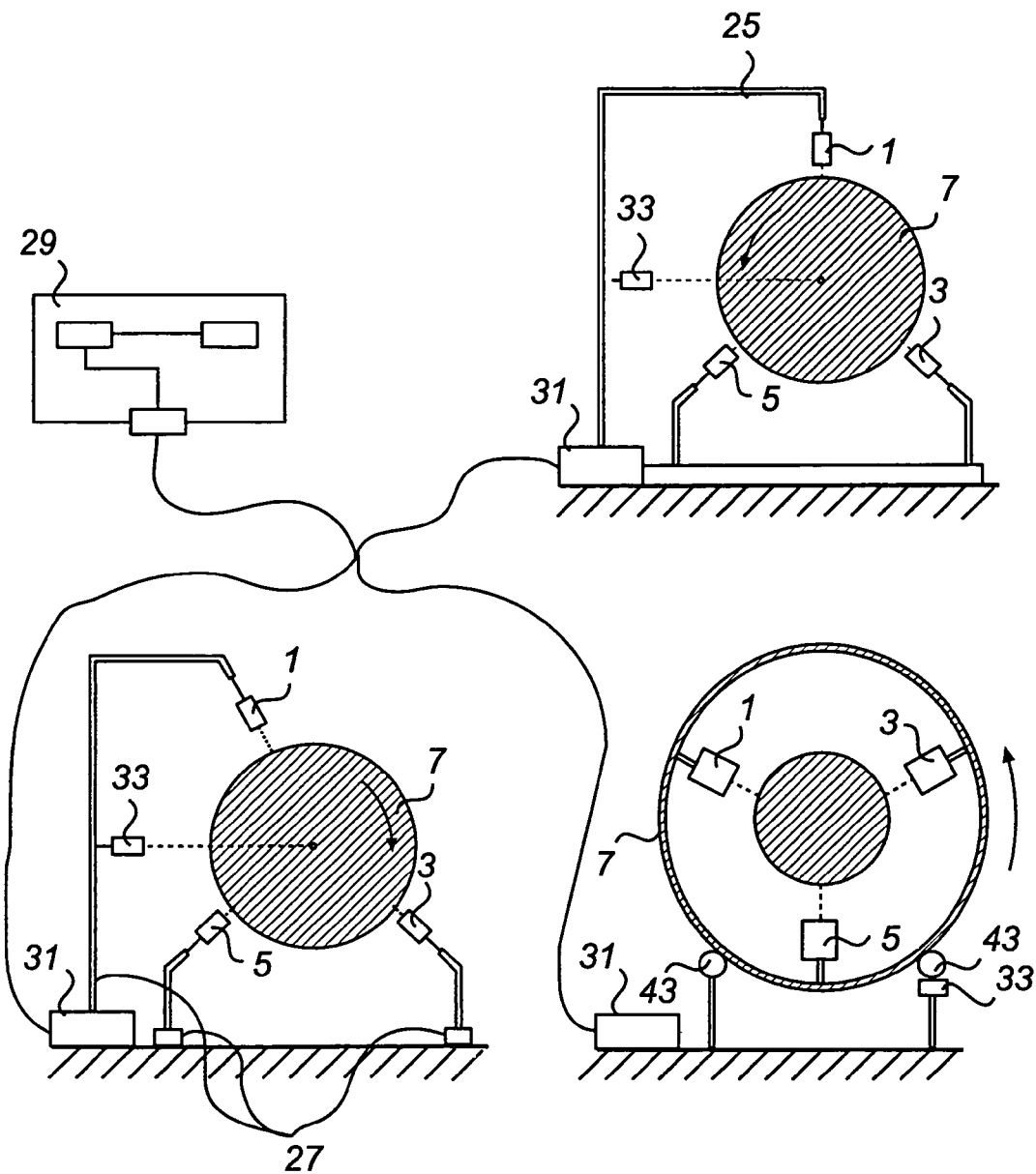
In FIG. 7, preferred embodiments of the distance measuring arrangement are shown.

In FIG. 7, preferred embodiments of the distance measuring arrangement 23 are given. They are constituted by a support frame 25 and the at least three distance gauges 1, 3, 5 are arranged thereto in relation to the distance measuring angles. The mechanical object 7 may is rotated a full revolution in the measuring process. In a preferred embodiment, the distance gauges 1, 3, 5 present means so that their location on the support frame 25 may be altered in order to increase the flexibility in in situ measuring. In one of the embodiments, the support frame 25, to which the distance gauges 1, 3, 5 are mounted, is rotated around the mechanical object 7. In one of the embodiments, the distance measuring arrangement 23 is constituted by separate support elements 27, of which each presents at least one distance gauge.

In a preferred embodiment, a device may comprise one or more distance measuring arrangements 23, 25, as indicated in FIG. 7.

In a preferred embodiment, the distance measuring arrangement 23 further comprises at least one A/D converter 31 for converting distances measured by the at least three distance gauges 1, 3, 5.

In a preferred embodiment, the distance measuring arrangement 23 further comprises an encoder 33.

Figure 8:
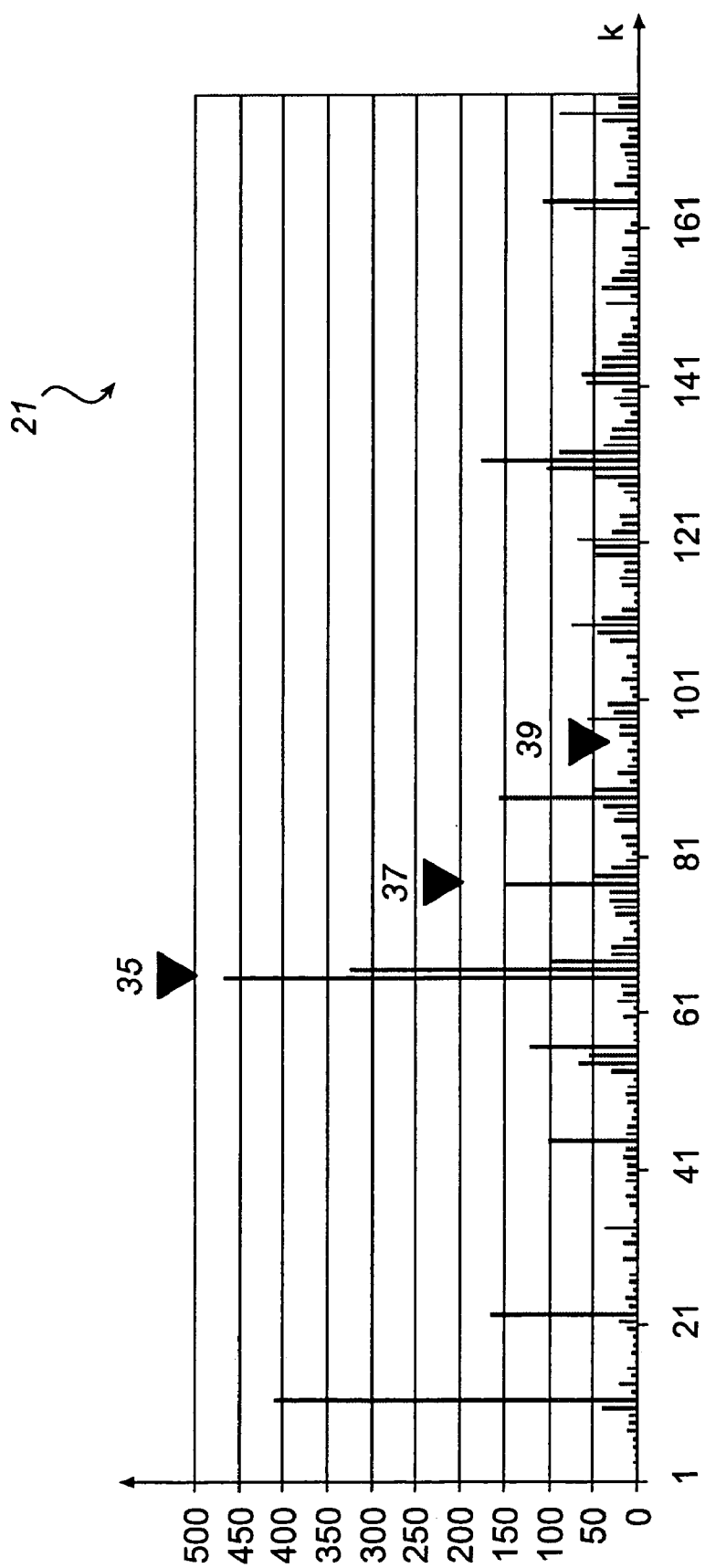
In FIG. 8, a schematic example of a function deviation of one or more details of the manufacturing equipment is given.

In a preferred embodiment, the processor 9 is further configured for indicating, using an output means 13, a function deviation of one or more details of the manufacturing equipment that was involved in processing a surface of the mechanical object 7. The indication is based on the correspondence between the Fourier transformation of the deviation profile 21 and at least one function deviation indicating frequency. The surface of the mechanical object 7 is measured in a processing direction of the manufacturing equipment, or at least presents a component in the processing direction of the manufacturing equipment. In FIG. 8, an example of a function deviation of one or more details of the manufacturing equipment.

From the information presented in FIG. 8 a user can draw the conclusion that a function deviation affecting the mechanical object 7 has occurred in the manufacturing equipment, namely in belt A 35. Thus belt A 35 needs servicing. Belt B 37 should be monitored more frequently, and belt C 39 seem fine.

In a preferred embodiment, the processor 9 is further configured for configuring a frequency map comprising a set of function deviations indicating frequencies, i.e. modify the set of function deviation frequencies that are comprised in the frequency map.

Figure 9A:
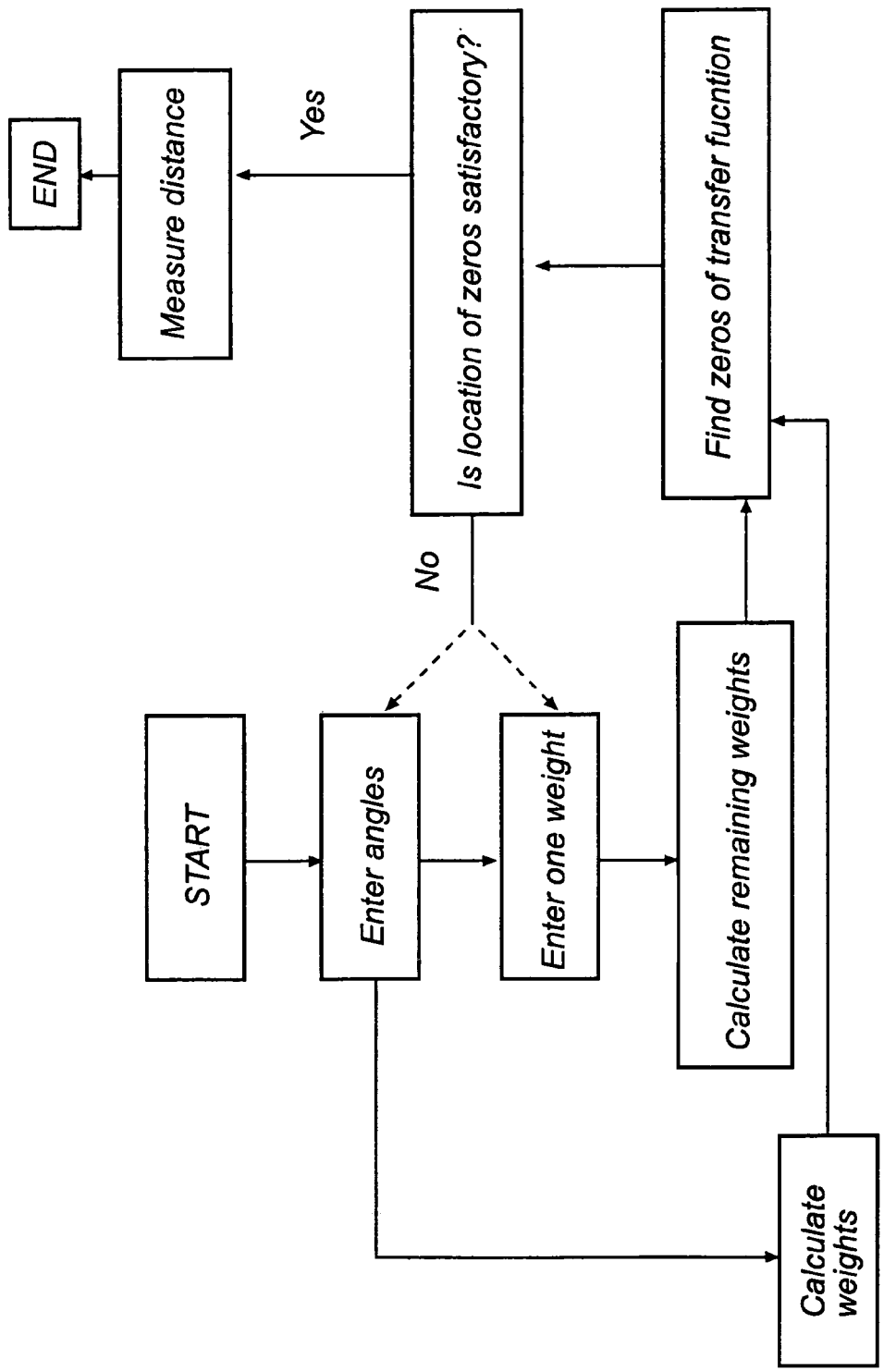
In FIG. 9A, an embodiments of an algorithm for configuring and indicating the quality of the distance measuring angles are given, in the case when weights are used.

In FIG. 9A, an embodiment of the process of configuring and indicating the quality of the distance measuring angles is given. A first one comprises the following steps:
1. Enter angles
2. Enter one weight
3. Calculate remaining weights
4. Find the zeroes of the transfer function
5. Query whether locations of the zeroes are satisfactory
6. If satisfactory, proceed with measuring of surface.

Alternatively, the need of entering a weight may be removed by the processor automatically setting one weight, i.e. the second step above is not necessary. This means that one weight may be either preset or set randomly.

Figure 9B:
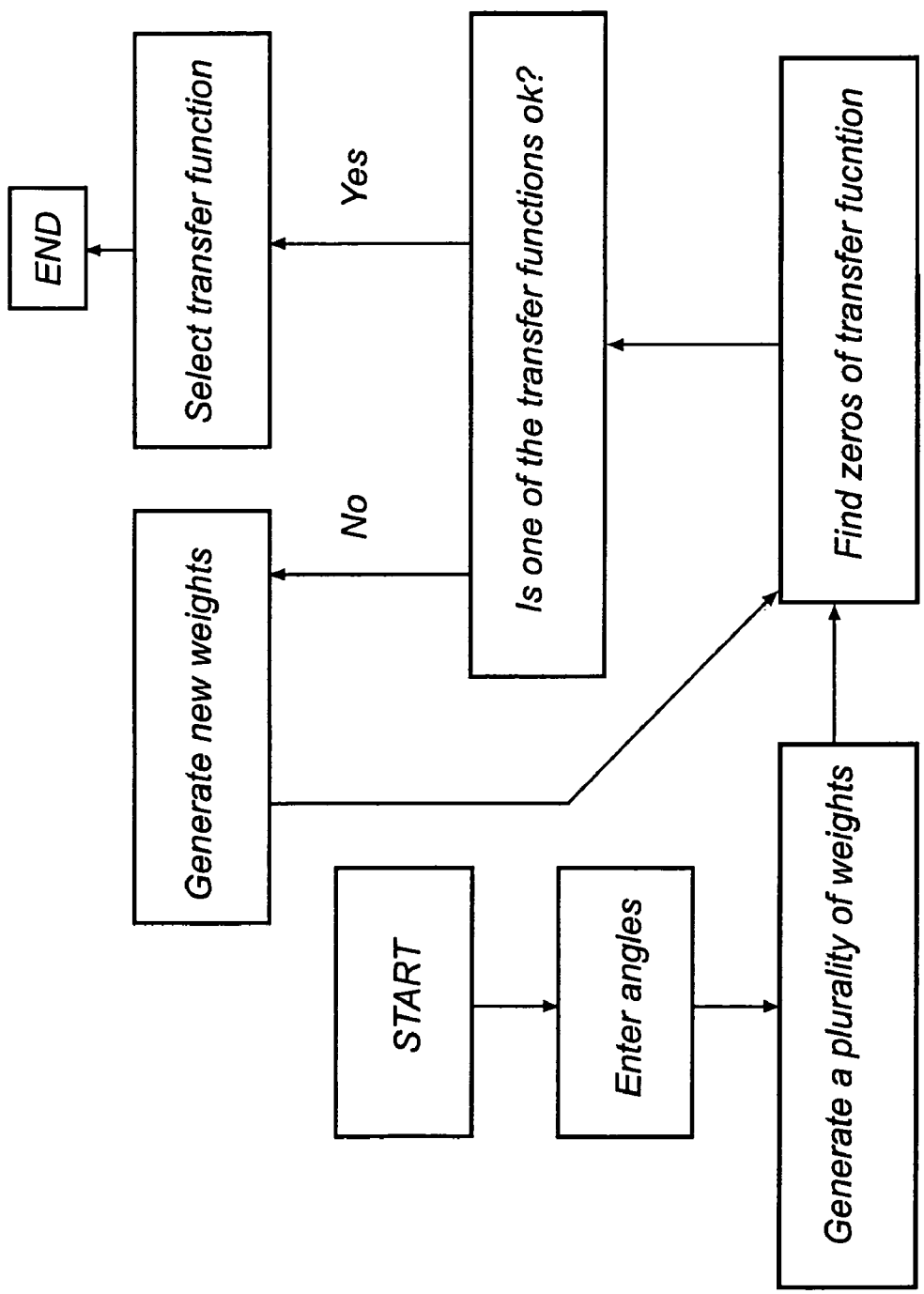
In FIG. 9B, an embodiments of an algorithm for configuring and indicating the quality of the distance measuring angles are given, in the case when weights are not used.

In FIG. 9B, an embodiment of an approach leading to a plurality of weights being generated is shown. This approach comprises the following steps:
1. Enter angles
2. Generate a plurality of weight sets
3. Find zeroes of the transfer functions including the weight sets
4. Prompting user selection of a transfer function presenting a satisfactory locations of zeros
5. If necessary go to step 1 or step 2
5. Proceed with measuring of surface.

Figure 10:
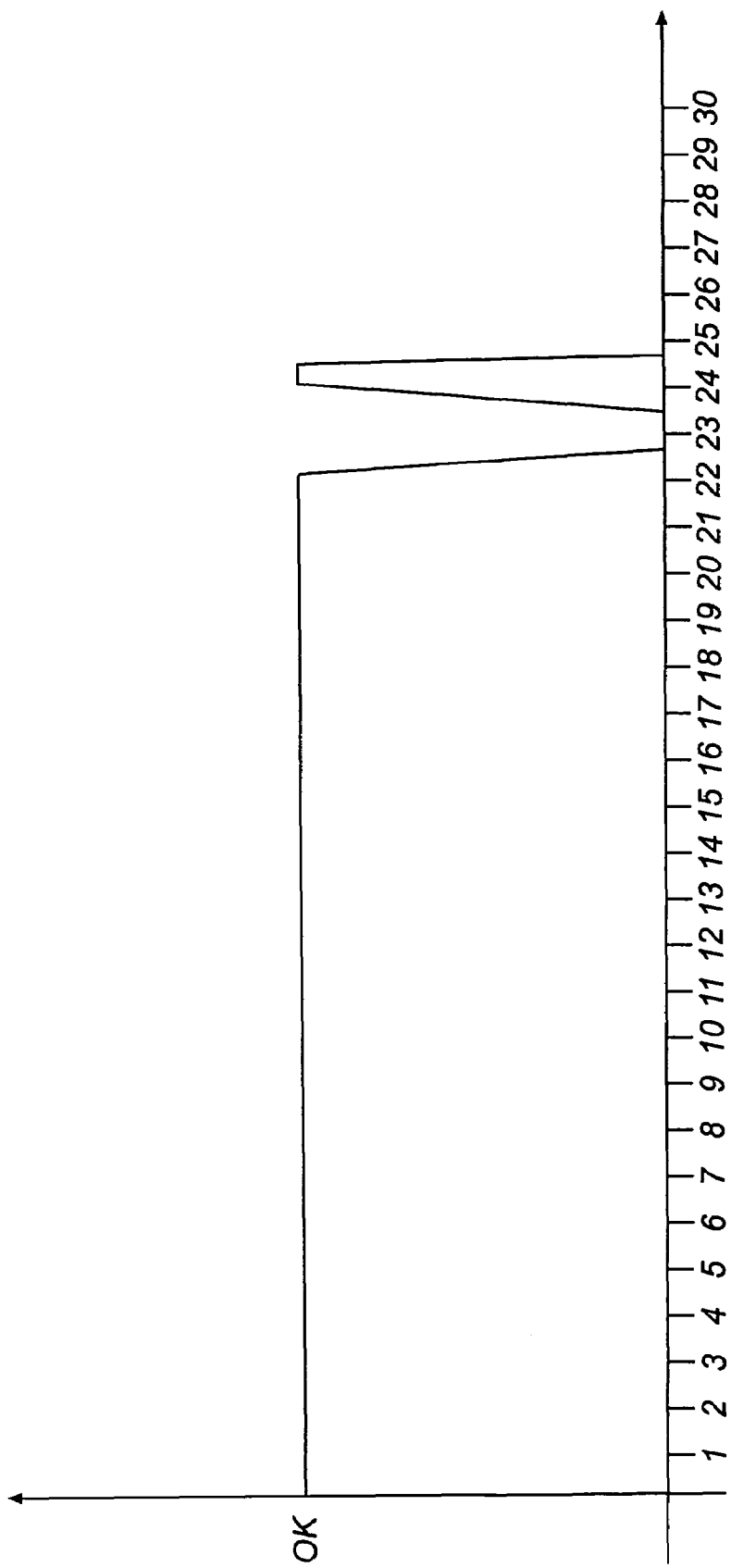
In FIG. 10, an example of locations of zeros of the transfer function is given.

In FIG. 10, an example of locations of zeros of the transfer function is given. In this example, they occur when k is 23 or 25.

In a preferred embodiment, in which indicating at least one of an orbit of, and a deviation from a nominally round surface of a mechanical object 7, such as a ring or a shaft, and the method parameters (angles and weights, in the case when weights are needed) have been set, the surface measuring process commences by a relative rotation between distance gauges 1, 3, 5 and the mechanical object 7. The distance measuring results in three signals, one from each distance gauge.

Figure 11:
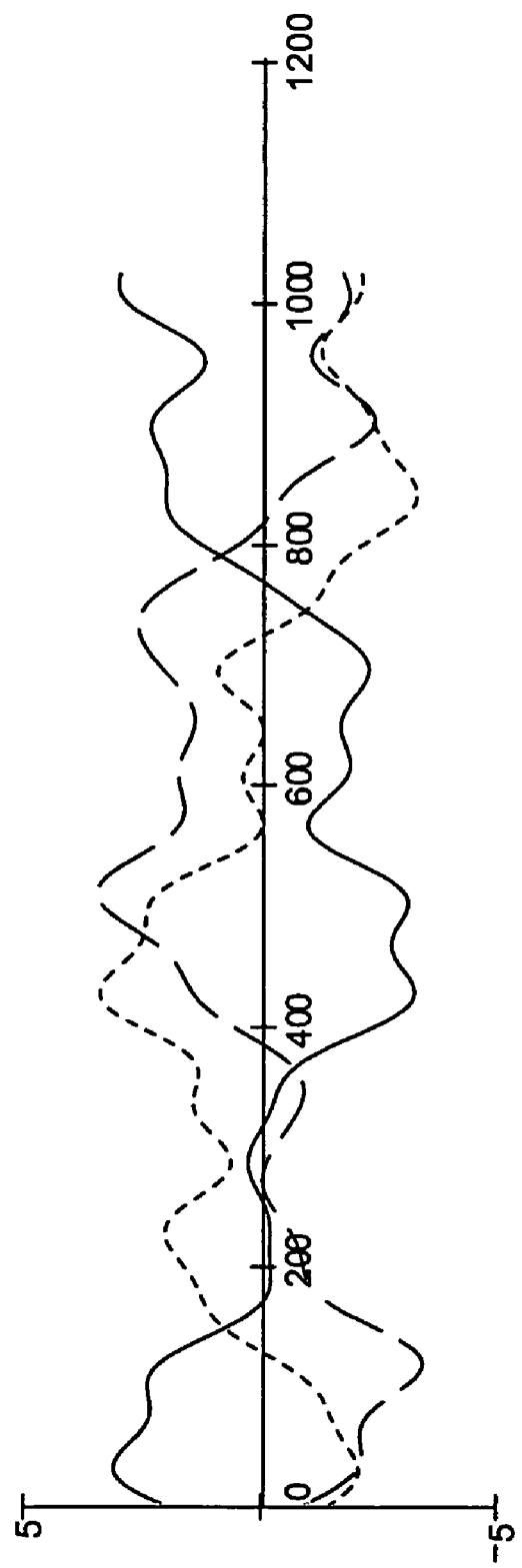
In FIG. 11, examples of three noise free signals (one from each distance gauge, in the case when the number of distance gauges are three) from the distance measuring process are given.
Figure 12A:
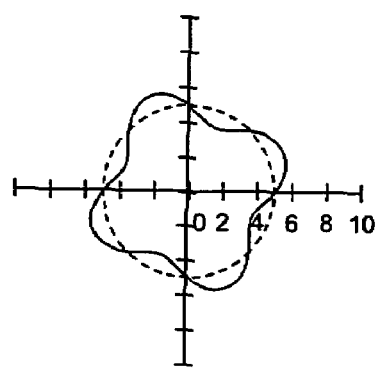
In FIGS. 12A, 12B, 12C, examples of roundness profiles of the examples of the three noise free signals in FIG. 11 are given.
Figure 13A:
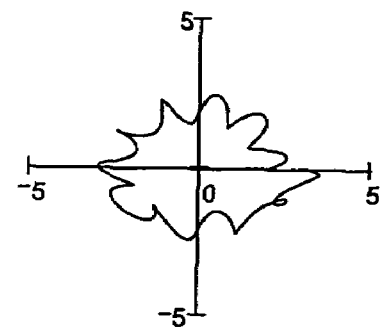
In FIGS. 13A, 13B, 13C, examples of orbits of the examples of the three noise free signals in FIG. 11 are given.
Figure 12B:
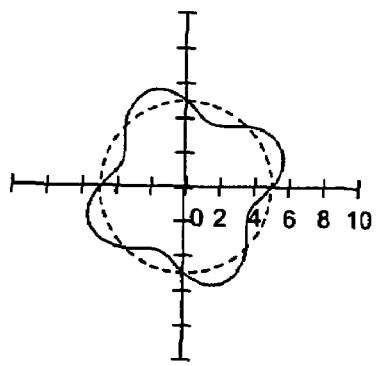
Figure 13B:
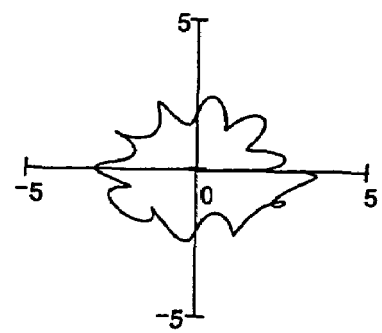
Figure 12C:
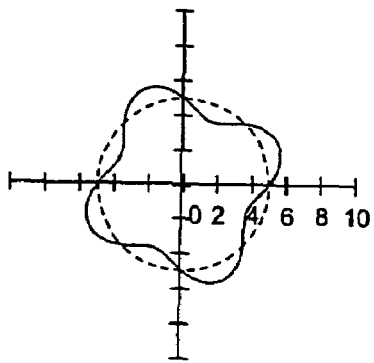
Figure 13C:
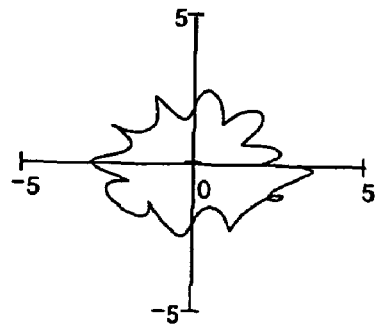

In FIG. 11, examples of three noise free signals (one from each distance gauge, in the case when the number of distance gauges are three) from the distance measuring process are given. This distance data will be used when illustrating the different ways of calculating at least one of roundness of a mechanical object and the orbit of a mechanical object 7. In FIGS. 12A, 12B, 12C, examples of roundness profiles of the examples of the three noise free signals in FIG. 11 are given. In FIGS. 13A, 13B, 13C, examples of orbits of the of the three noise free signals in FIG. 11 are given.

In FIGS. 12A and 13A, the generation of the deviation profile 23, in this case roundness and orbit, was based on the following expression (the distance data sets comprise three distances):

$$\begin{cases} g_0(\varphi) = x(\varphi) + r(\varphi) \\ g_1(\varphi) = x(\varphi)\cos\gamma_1 + y(\varphi)\sin\gamma_1 + r(\varphi - \gamma_1) \\ g_2(\varphi) = x(\varphi)\cos\gamma_2 + y(\varphi)\sin\gamma_2 + r(\varphi - \gamma_2) \end{cases}$$

as illustrated above.

In FIGS. 12B and 13B, the generation of the deviation profile 23, in this case roundness and orbit, was based on the following expression (the distance data sets comprise three distances):

$$kr=R, \text{ where}$$

where r is a vector comprising $r_i$ being the distance read by distance gauge i (i=1 . . . 3) and k is a vector comprising weights ki (i=1 . . . 3), as illustrated above.

In FIGS. 12C and 13C, the generation of the deviation profile 23, in this case roundness and orbit, was based on the following expression (the distance data sets comprise three distances):

$$AR=G, \text{ as illustrated above.}$$

Figure 14:
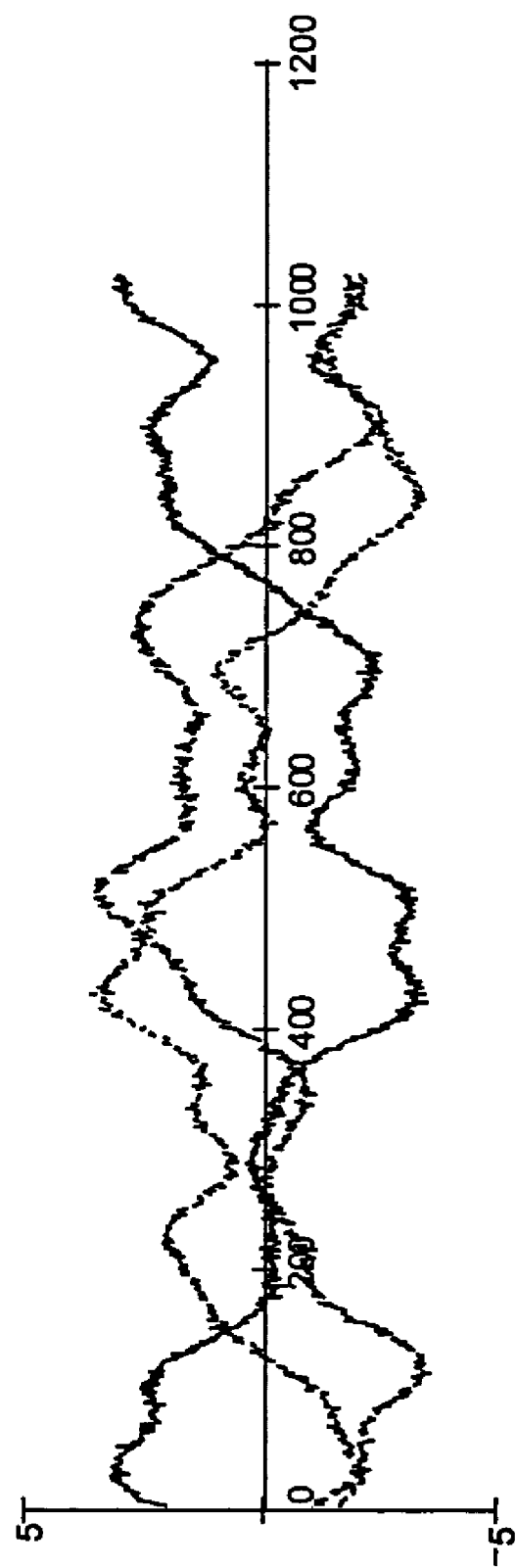
In FIG. 14 examples of three signals with noise (one from each distance gauge, in the case when the number of distance gauges are three) from the distance measuring process are given.
Figure 15A:
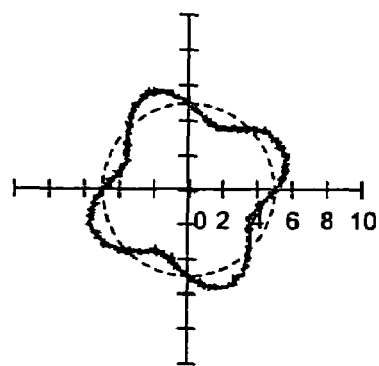
In FIGS. 15A, 15B, 15C, examples of roundness profiles of the examples of the three signals with noise in FIG. 14 are given.
Figure 16A:
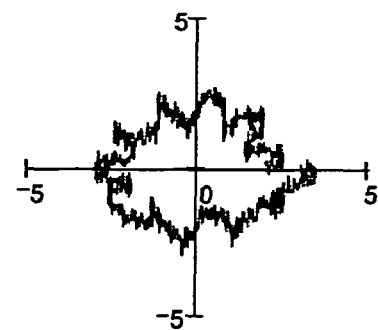
In FIGS. 16A, 16B, 16C, examples of orbits of the examples of the three noise free signals in FIG. 14 are given.
Figure 15B:
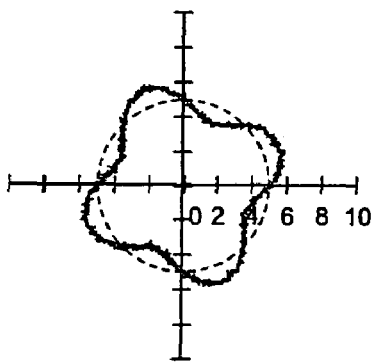
Figure 16B:
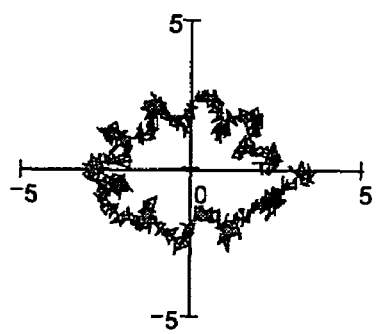
Figure 15C:
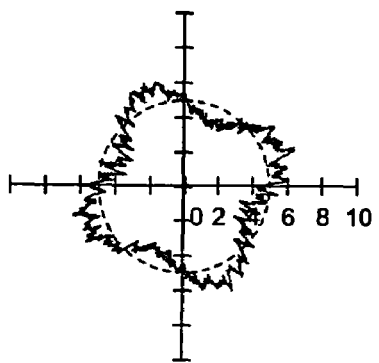
Figure 16C:
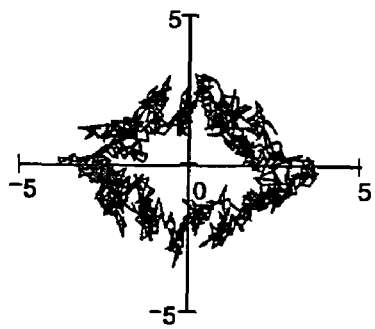

In FIG. 14, examples of three signals with noise (one from each distance gauge, in the case when the number of distance gauges are three) from the distance measuring process are given. In FIGS. 15A, 15B, 15C, examples of roundness profiles of the examples of the three signals with noise in FIG. 14 are given. In FIGS. 16A, 16B, 16C, examples of orbits of the corresponding examples of the three noise free signals in FIG. 14 are given.

In FIGS. 15A and 16A, the generation of the deviation profile 23, in this case roundness and orbit, was based on the following expression (the distance data sets comprise three distances):

$$\begin{cases} g_0(\varphi) = x(\varphi) + r(\varphi) \\ g_1(\varphi) = x(\varphi)\cos\gamma_1 + y(\varphi)\sin\gamma_1 + r(\varphi - \gamma_1) \\ g_2(\varphi) = x(\varphi)\cos\gamma_2 + y(\varphi)\sin\gamma_2 + r(\varphi - \gamma_2) \end{cases}$$

as illustrated above.

In FIGS. 15B and 16B, the generation of the deviation profile 23, in this case roundness and orbit, was based on the following expression (the distance data sets comprise three distances):

$$kr=R, \text{ where}$$

where r is a vector comprising $r_1$ being the distance read by distance gauge i (i=1 . . . 3) and k is a vector comprising weights $k_i$ (i=1 . . . 3), as illustrated above.

In FIGS. 15C and 16C, the generation of the deviation profile 23, in this case roundness and orbit, was based on the following expression (the distance data sets comprise three distances):

$$AR=G, \text{ as illustrated above.}$$

In a preferred embodiment, in case the distance data, or distance data sets, generated as a result of the distance measuring, sets comprise more than three distances, the processor 9 is configured for estimating a measurement error limit.

Preferred embodiments of the device for measuring distance data sets being used as input to a device for indicating at least one of an orbit of, and a deviation from a nominally round surface of a mechanical object 7, wherein the device comprising a processor 9 and output means ii, and where the processor 9 is configured for generating a deviation profile 23 based on distance data sets covering the nominally round surface; each distance data set comprising at least three distances to the nominally round surface and related to an angle, the at least three distances having been measured at distance measuring angles; and weights related to the distance measuring angles; and indicating the deviation profile 23 using the output means, will now be given. The device for measuring distance data sets comprises an encoder 33 and a distance measuring arrangement 23 comprising at least three distance gauges 1, 3, 5 for measuring at least three distances, wherein each distance data set comprises the at least three distances to the nominally round surface and related to an angle, and the at least three distances measured at distance measuring angles.

Figure 17:
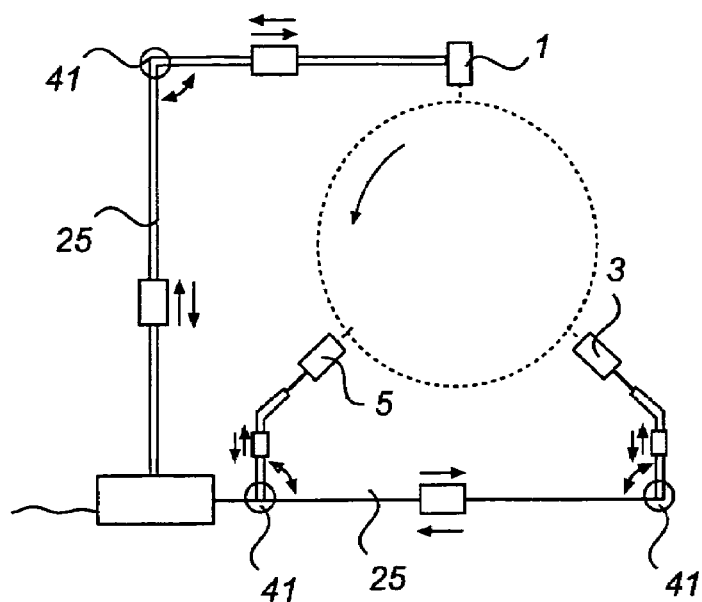
In FIG. 17, an embodiment of a distance measuring arrangement comprising three distance gauges is given, where the distance gauges are mounted onto a single support frame.

In FIG. 17, a distance measuring arrangement 23 comprising three distance gauges 1, 3, 5 is given, where the distance gauges are mounted onto a single support frame 25. During measuring, the mechanical object 7 is rotated. Objects of the support frame 25 may be provided with extending/contracting means, such as presenting a telescopic function, which is indicated in FIG. 17 by arrows. Also, the support frame 25 may be provided with a joint means 41 allowing a distance gauge to be fixed in a preferred angular position.

Figure 18:
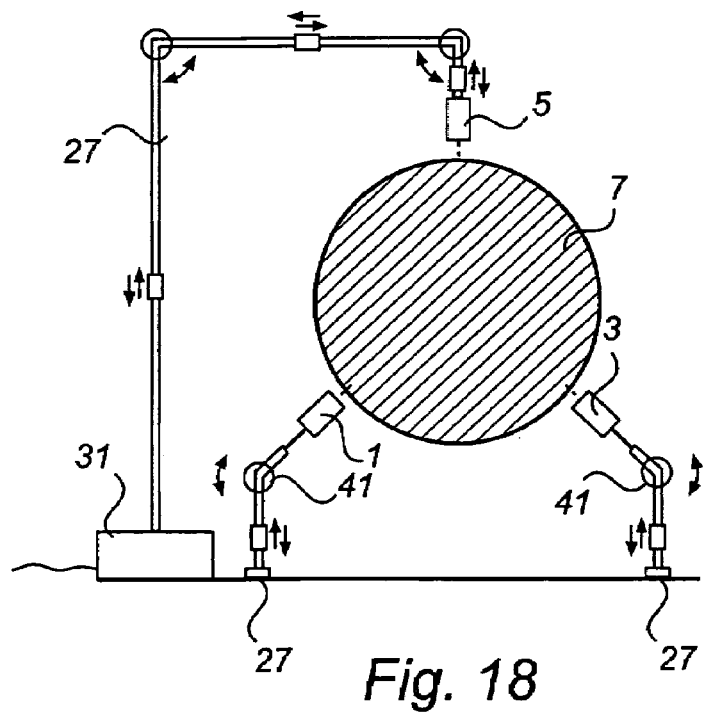
In FIG. 18, an embodiment of the support frame is constituted by a number of sub-support frames that are smaller and suitably placed in connection to the mechanical object.
Figure 19:
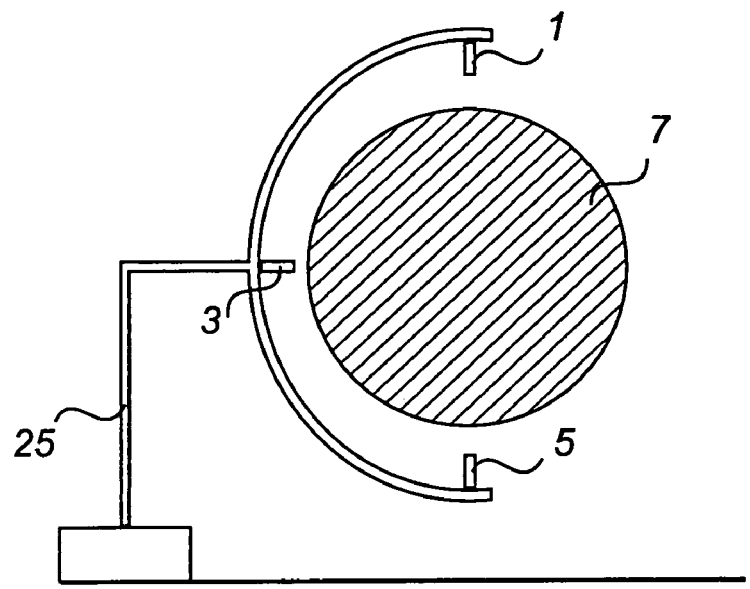
In FIG. 19, an embodiment of the support frame is constituted by an arrangement at least partly encompassing a measuring path of the mechanical object.

Also, the support frame 25 may be provided with freely placeable sub system distance measuring arrangements 23, as indicated in FIG. 18, in relation to the support frame, which may be preferred when measuring in situ on locations presenting a challenging measuring environment. In another embodiment the support frame 25 may be similar to the shape of the surface to be measured, as indicated in FIG. 19, in which an embodiment of the support frame 25 constituted by an arrangement at least partly encompassing a measuring path of the mechanical object 7 is given. In an embodiment it may be stationary, e.g. fixed to a machine.

Figure 20:
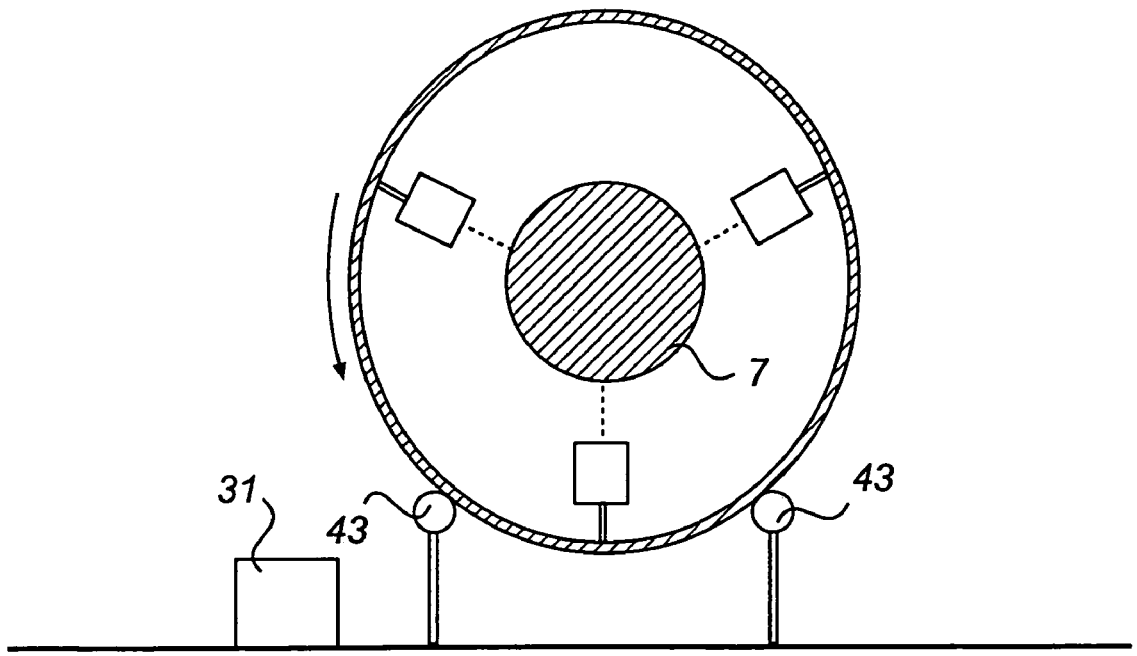
In FIG. 20, an embodiment is given in which the support frame presents a distance measuring arrangement that is rotatable around the surface of the mechanical object to be measured.

In FIG. 20, an embodiment of a support frame 25 is given in which the mechanical object 7 to be measured is rotated and the measuring arrangement is maintained in a stationary position. The distance measuring arrangement 23 presents a number of distance gauges 1, 3, 5 fixed to the distance measuring arrangement 23. The support frame 25 comprises means 43 allowing the rotation of the distance measuring arrangement 23.

In an embodiment, the distance gauges 1, 3, 5 are removably fixable to the distance measuring arrangement 23, e.g. in terms of angles according to the distance-measuring angels.

In an embodiment, the device, comprises at least one A/D converter 31 for converting distances measured by the at least three distance gauges 1, 3, 5.

In an embodiment, the device comprises a storage means for storing the distance data sets, or distance data.

In an embodiment, the device comprises means for storing distance data sets, or distance data, on a portable media.

In an embodiment, the device comprises communication capabilities for communicating the distance data sets to a device for indicating at least one of an orbit of, and a deviation from a nominally round surface of a mechanical object. In an embodiment, the device comprises weights related to the distance measuring angles.

Figure 21:
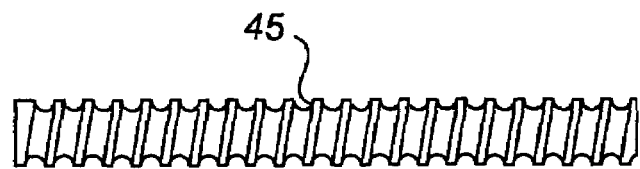
In FIG. 21, an embodiment where the mechanical object is a object presenting threads, e.g. a screw, is schematically given.

In an embodiment, the device may be used to generate a deviation profile in the case where the mechanical object 7 is an object presenting threads 45, e.g. a screw, is given. The principle underlying this embodiment is schematically illustrated in FIG. 21. In FIG. 21, the arrow indicates the distance measuring direction. Three distance gauges 1, 3, 5 are located, using appropriate distance measuring angles, along a thread 45 for reading the distances to the surface of the thread 45. Thereafter, the distance data is processed as illustrated above leading to a deviation profile 21.

Figure 22:
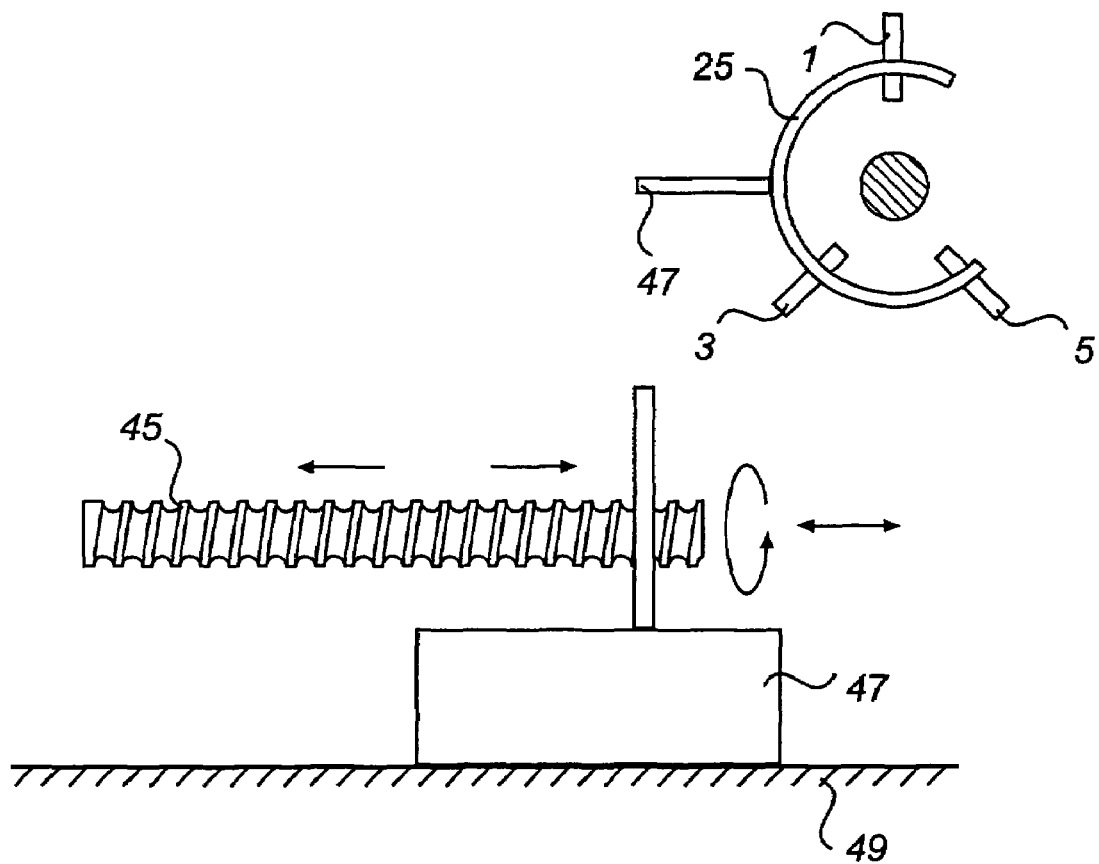
In FIG. 22, a hardware-oriented embodiment is given in the case where the mechanical object is a object presenting threads, e.g. a screw, is given.

In FIG. 22, a hardware-oriented embodiment is given in the case where the mechanical object 7 presents threads 45, e.g. a screw, is given. In FIG. 22, a holding means 47 holding a frame 25 to which the distance gauges 1, 3, 5 are arranged. The holding means 47 is arranged to a slide 49 allowing the frame to slide in relation to the thread 45. To accomplish the relative movement between the frame 25 and thread 45, at least one of the thread 45 and the frame 25 is rotated. This is indicated by the arrows.

Figure 23:
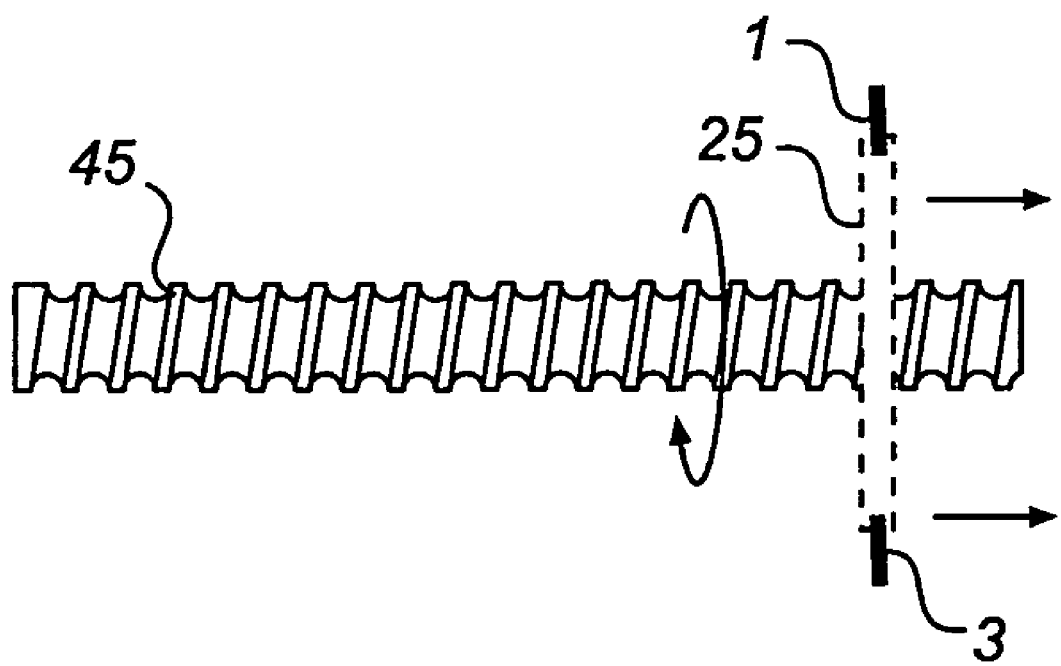
In FIG. 23, in an embodiment, the screw itself is used for controlling the traversing of the frame.

In FIG. 23, in an embodiment, the mechanical object 7 presenting the thread 45 is used for controlling the traversing of the frame 25, i.e. the thread 45 may take the place of the slide 49. By rotating the frame 25, the distance gauges 1, 3, 5 read the distances for subsequent generating of the deviation profile 21.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for indicating at least one of an orbit of, and a deviation from a nominally round surface of a mechanical object, the device comprising:
   a processor; and
   output means for outputting a deviation profile,
   wherein the processor for generating the deviation profile based on distance data sets covering the nominally round surface; each distance data set comprising at least three distances, measured in a direction of rotation, to the nominally round surface and related to an angle, the at least three distances having been measured at distance measuring angles; and the processor for indicating the deviation profile using the output means wherein the distance measuring angles are selected such that the locations of zeroes in a transfer function used in generating the deviation profile are satisfactory.

2. The device according to claim 1, wherein the processor is further configured for generating the deviation profile by solving a system of simultaneous equations including the distance data sets and the distance measuring angles.

3. The device according to claim 1, wherein the processor is further configured for generating the deviation profile including forming linear combinations of the distance data sets and weights related to the distance measuring angles.

4. The device according to claim 1, wherein the processor is further configured to use Fourier transforms in generating the deviation profile.

5. The device according to claim 1, wherein the processor for indicating a quality of the distance measuring angles.

6. The device according to claim 1, wherein, in case the distance data sets comprise more than three distances, the processor for estimating a measurement error limit.

7. The device according to claim 1, wherein the quality of a nominally round surface is determined.

8. The device according to claim 1, further comprising a distance measuring arrangement comprising at least three distance gauges for measuring the at least three distances.

9. The device according to claim 8, wherein the distance measuring arrangement is constituted by a support frame and the at least three distance gauges are arranged thereto in relation to the distance measuring angles.

10. The device according to claim 8, wherein the distance measuring arrangement is constituted by separate support elements, of which each presents at least one distance gauge.

11. The device according to claim 8, wherein the distance measuring arrangement further comprises at least one A/D converter for converting distances measured by the at least three distance gauges.

12. Amended) The device according to claim 8, wherein the distance measuring arrangement further comprises an encoder.

13. The device according to claim 8, wherein the distance measuring angles are 3P1/4, 0 (zero), and 7P116.

14. The device according to claim 3, wherein the processor for indicating, using the output means, a function deviation of one or more details of manufacturing equipment having processed the surface based on the correspondence between a Fourier transformation of the deviation profile and at least one function deviation indicating frequency.

15. The device according to claim 14, wherein the distance data corresponds to a line of the surface of the mechanical object, the line being in one of:
   a processing direction of the manufacturing equipment, and
   at least presenting a component in the processing direction of the manufacturing equipment.

16. The device according to claim 14, wherein the manufacturing equipment is constituted by at least one of the equipment types for grinding, hot rolling, cold rolling, turning, milling, printing, polishing, and honing.

17. The device according to claim 14, wherein the processor is arranged to generate a frequency map comprising a set of function deviation indicating frequencies.

18. A storage means comprising distance data usable for a device according to claim 1, the storage means comprising sets of at least three distances to a nominally round surface related to an angle and having been measured at distance measuring angles.

19. The device for measuring distance data sets as input to a device according to claim 1, comprising an encoder and a distance measuring arrangement comprising at least three distance gauges for measuring at least three distances, wherein
   each distance data set comprises the at least three distances to the nominally round surface and related to an angle, and
   the at least three distances measured at distance measuring angles.

20. The device according to claim 19, wherein the distance measuring arrangement is constituted by a support frame and the at least three distance gauges are arranged thereto in relation to the distance measuring angles.

21. The device according to claim 19, wherein the distance measuring arrangement is constituted by separate support elements, of which each presents at least one distance gauge.

22. The device according to claim 19, wherein the distance measuring arrangement further comprises at least one A/D converter for converting distances measured by the at least three distance gauges.

23. The device according to claim 19, further comprising a storage means for storing the distance data sets.

24. The device according to claim 19, further comprising means for storing distance data sets on a portable media.

25. A method for indicating at least one of an orbit of, and a deviation from a nominally round surface of a mechanical object, the method comprising the steps of:
   generating a deviation profile based on distance data sets covering the nominally round surface, each distance data set comprising at least three distances, measured in a direction of rotation, to the nominally round surface and related to an angle, the at least three distances having been measured at distance measuring angles; and
   indicating the deviation profile.

26. The method according to claim 25, further comprising the step of generating the deviation profile by solving a system of simultaneous equations including the distance data sets and the distance measuring angles.

27. The method according to claim 25, further comprising the step of Fourier transforming the deviation profile.

28. The method according to claim 25, further comprising the step of indicating a quality of the distance measuring angles.

29. The method according to claim 25, wherein the distance measuring angles are 3P1/4, 0 (zero), and 7P1/6.

30. The method according to claim 25, further comprising the step of estimating a measurement error limit, in case the distance data sets comprise more than three distances.

31. The method according to claim 25 for indicating the quality of a nominally round surface.

32. The method according to claim 27, further comprising the step of:
   indicating a function deviation of one or more details of manufacturing equipment having processed the surface based on the correspondence between the Fourier transformation of the deviation profile and at least one function deviation indicating frequency.

33. The method according to claim 32, wherein the distance data corresponds to a line of the surface of the mechanical object, the line being in one of:
   a processing direction of the manufacturing equipment, and
   at least presenting a component in the processing direction of the manufacturing equipment.

34. The method according to claim 32, wherein the manufacturing equipment is constituted by at least one of the equipment types for grinding, hot rolling, cold rolling, turning, milling, printing, polishing, and honing.

35. The method according to claim 32, further comprising the step of configuring a frequency map comprising a set of function deviation indicating frequencies.

36. A computer program product loadable into the internal memory of a computer, comprising software code portions for performing the method of claim 25, when run on a computer.

37. A carrier characterized by comprising the computer program product in claim 36.

38. The method of claim 18, wherein the step of generating the deviation profile, R, is based on the following expression:
   AR=G, where
   A is a matrix based on the distance measuring angles,
   R is a vector comprising the deviation profile, and
   G is a matrix comprising the distances data sets.

39. The method of claim 38, wherein the vector R comprises stacked data concerning the deviation from a nominally round surface and the orbit in two dimensions of the mechanical object.

40. The method of claim 38, wherein the vector R is in the form of a matrix.

41. The method of claim 18, wherein the step of generating the deviation profile, R, based on the following expression, in the case the distance data sets comprise three distances:
   kr=R, where
   where r is a vector comprising $r_i$ being the distance read by distance gauge i (i=1 . . . n) and k is a vector comprising weights $k_i$ (i=1 . . . n).

42. A device for indicating at least one of an orbit of, and a deviation from a nominally round surface of a mechanical object, the device comprising:
   a processor; and
   output means for outputting a deviation profile,
   wherein the processor for generating the deviation profile based on distance data sets covering the nominally round surface; each distance data set comprising at least three distances, measured in a direction of rotation, to the nominally round surface and related to an angle, the at least three distances having been measured at distance measuring angles; and the processor for indicating the deviation profile using the output means, wherein the step of generating the deviation profile, R, is based on the following expression:

AR=G, where

A is a matrix based on the distance measuring angles,

R is a vector comprising the deviation profile, and

G is a matrix comprising the distances data sets.

43. The device of claim 42, wherein the vector R comprises stacked data concerning the deviation from a nominally round surface and the orbit in two dimensions of the mechanical object.

44. The device of claim 42, wherein the vector R is in the form of a matrix.

45. A device for indicating at least one of an orbit of, and a deviation from a nominally round surface of a mechanical object, the device comprising:

a processor; and output means for outputting a deviation profile, wherein the processor for generating the deviation profile based on distance data sets covering the nominally round surface; each distance data set comprising at least three distances, measured in a direction of rotation, to the nominally round surface and related to an angle, the at least three distances having been measured at distance measuring angles; and the processor for indicating the deviation profile using the output means, wherein the step of generating the deviation profile, R, is based on the following expression, in the case the distance data sets comprise three distances:

kr=R, where where r is a vector comprising $r_i$ being the distance read by distance gauge i (i=1 . . .n) and k is a vector comprising weights $k_1$ (i=1 . . .n).

* * * * *